US012377567B1

(12) United States Patent
Mankowski et al.

(10) Patent No.: US 12,377,567 B1
(45) Date of Patent: Aug. 5, 2025

(54) MUSHROOM TRIMMING AND SORTING SYSTEM

(71) Applicant: 4AG Robotics Inc., Salmon Arm (CA)

(72) Inventors: Peter Mankowski, Vernon (CA); Prashanth Haleyur Narayana Rao, Salmon Arm (CA); Mehfuz A. Rahman, Blind Bay (CA); James Boyd Gibson, Salmon Arm (CA)

(73) Assignee: 4AG Robotics Inc., Salmon Arm (CA)

( * ) Notice: Subject to any disclaimer, the term of this patent is extended or adjusted under 35 U.S.C. 154(b) by 0 days.

(21) Appl. No.: 18/957,448

(22) Filed: Nov. 22, 2024

(51) Int. Cl.
| | |
|---|---|
| *B25J 11/00* | (2006.01) |
| *B07C 5/342* | (2006.01) |
| *B26D 5/00* | (2006.01) |
| *B26D 7/32* | (2006.01) |
| *B25J 15/00* | (2006.01) |
| *B25J 15/06* | (2006.01) |

(52) U.S. Cl.
CPC ............ *B26D 5/007* (2013.01); *B07C 5/3422* (2013.01); *B25J 11/0045* (2013.01); *B26D 7/32* (2013.01); *B07C 2501/0063* (2013.01); *B07C 2501/0081* (2013.01); *B25J 15/0028* (2013.01); *B25J 15/0616* (2013.01); *B26D 2210/02* (2013.01)

(58) Field of Classification Search
CPC .............................. B25J 11/0045; B26D 5/007
See application file for complete search history.

(56) References Cited

U.S. PATENT DOCUMENTS

| | | | |
|---|---|---|---|
| 2,853,333 | A | 9/1958 | Littell |
| 2,940,713 | A | 6/1960 | Van Dusen |
| 3,183,640 | A | 5/1965 | Eugene et al. |

(Continued)

FOREIGN PATENT DOCUMENTS

| | | |
|---|---|---|
| CA | 2041824 A1 | 11/1991 |
| CA | 2609122 A1 | 10/2006 |

(Continued)

OTHER PUBLICATIONS

Azoyan, "Feasibility Analysis of an Automated Mushroom Harvesting System," 2004, Athens, Georgia.

(Continued)

*Primary Examiner* — Sean M Michalski
(74) *Attorney, Agent, or Firm* — McKee, Voorhees & Sease, PLC

(57) ABSTRACT

A mushroom trimming and sorting system comprises a stem trimming device, a positioning system, an imager set, and a controller operable to control the positioning system to move a single mushroom into view of the imager set, to generate an image set of the mushroom, and to process the image set (and optionally other sensor data) to determine mushroom properties of the mushroom. The positioning system may include a SCARA robot with suction-type end effector and single-mushroom elevator with gripping mandibles. The processing may employ a trained machine-learning model. The mushroom properties may include a length of an end portion of the stem bearing soil, and a sorting category of the mushroom based on parameters of the cap including degree of gill opening. The end portion is them trimmed to eliminate soil and other defects, and sorting the mushroom into one of a plurality of receptacles.

20 Claims, 14 Drawing Sheets

(56) References Cited

U.S. PATENT DOCUMENTS

| | | | | |
|---|---|---|---|---|
| 3,537,495 | A | 11/1970 | Pearson | |
| 3,568,959 | A | 3/1971 | Blaff | |
| 3,635,005 | A | 1/1972 | Persson | |
| 3,765,408 | A | 10/1973 | Kawai | |
| 4,453,755 | A | 6/1984 | Blatt et al. | |
| 4,472,929 | A | 9/1984 | MacCanna et al. | |
| 4,519,193 | A | 5/1985 | Yoshida et al. | |
| 4,545,186 | A | 10/1985 | MacCanna | |
| 4,600,229 | A | 7/1986 | Oten | |
| 4,768,919 | A | 9/1988 | Borgman et al. | |
| 4,828,306 | A | 5/1989 | Blatt | |
| 4,852,926 | A | 8/1989 | Littell | |
| 4,883,939 | A | 11/1989 | Sagi | |
| 4,975,016 | A | 12/1990 | Pellenc et al. | |
| 5,035,109 | A | 7/1991 | Van Den Top | |
| 5,058,368 | A | 10/1991 | Wheeler | |
| 5,185,989 | A * | 2/1993 | Russell | A01G 18/70 56/DIG. 8 |
| 5,201,560 | A | 4/1993 | Golden | |
| 5,234,375 | A | 8/1993 | Hendriks | |
| 5,344,202 | A | 9/1994 | Ramler et al. | |
| 5,471,827 | A * | 12/1995 | Janssen | A01G 18/70 56/13.1 |
| 5,491,965 | A | 2/1996 | Wheeler et al. | |
| 5,935,136 | A | 8/1999 | Hulse et al. | |
| 7,185,603 | B2 | 3/2007 | Correa et al. | |
| 7,204,792 | B2 | 4/2007 | Hagihara et al. | |
| 7,207,609 | B2 | 4/2007 | Ilich | |
| 7,280,890 | B2 | 10/2007 | Seemann | |
| 7,281,739 | B2 | 10/2007 | Kniss | |
| 7,309,089 | B2 | 12/2007 | Perlman et al. | |
| 7,665,783 | B2 | 2/2010 | Nishio | |
| 7,854,108 | B2 | 12/2010 | Koselka et al. | |
| 8,005,570 | B2 | 8/2011 | Gloden et al. | |
| 8,033,087 | B2 * | 10/2011 | Rapila | A01G 18/70 56/13.1 |
| 9,527,115 | B2 | 12/2016 | LaRose et al. | |
| 9,623,570 | B1 | 4/2017 | Krahn et al. | |
| 9,730,394 | B2 | 8/2017 | Van De Vegte et al. | |
| 9,974,235 | B2 * | 5/2018 | Van De Vegte | A01G 18/00 |
| 10,654,177 | B2 | 5/2020 | Perlman et al. | |
| 10,674,666 | B2 | 6/2020 | Moore | |
| 10,785,912 | B2 | 9/2020 | Moore | |
| 10,814,498 | B2 | 10/2020 | Wagner et al. | |
| 10,850,402 | B2 | 12/2020 | Wagner et al. | |
| 11,154,010 | B2 * | 10/2021 | Good | B25J 9/026 |
| 11,657,488 | B2 * | 5/2023 | Kashkoush | A01G 18/00 47/1.1 |
| 11,889,789 | B2 * | 2/2024 | Glibetic | B25J 19/022 |
| 2005/0268587 | A1 | 12/2005 | McKeown | |
| 2009/0188771 | A1 | 7/2009 | Van Den Top | |
| 2009/0320430 | A1 * | 12/2009 | Rapila | A01G 18/70 56/194 |
| 2012/0210553 | A1 | 8/2012 | Chen | |
| 2012/0279122 | A1 | 11/2012 | Benne et al. | |
| 2013/0115028 | A1 | 5/2013 | Kremerman et al. | |
| 2013/0149076 | A1 | 6/2013 | Cox et al. | |
| 2013/0272823 | A1 | 10/2013 | Hudgens et al. | |
| 2014/0064886 | A1 | 3/2014 | Toshima | |
| 2017/0042095 | A1 * | 2/2017 | Van De Vegte | B25J 9/1697 |
| 2017/0265392 | A1 * | 9/2017 | Van De Vegte | B25J 11/0045 |
| 2019/0240813 | A1 | 8/2019 | Nakayama et al. | |
| 2020/0404845 | A1 * | 12/2020 | Good | A01D 45/00 |
| 2021/0082104 | A1 * | 3/2021 | Kashkoush | G06T 7/97 |
| 2023/0044563 | A1 | 2/2023 | Boudreau et al. | |
| 2023/0081119 | A1 | 3/2023 | Rohanimanesh et al. | |
| 2023/0150764 | A1 | 5/2023 | Ruehr | |
| 2023/0255153 | A1 | 8/2023 | Counne | |

FOREIGN PATENT DOCUMENTS

| | | | |
|---|---|---|---|
| CA | 3111952 | A1 | 9/2022 |
| CN | 107046933 | A | 8/2017 |
| CN | 109081036 | A | 12/2018 |
| CN | 108812086 | B | 5/2020 |
| CN | 113079954 | A1 | 7/2021 |
| DE | 10335021 | B3 | 11/2004 |
| EP | 0428284 | A1 | 5/1991 |
| EP | 0596189 | A1 | 5/1994 |
| EP | 3081071 | A1 | 10/2016 |
| GB | 1336393 | A | 11/1973 |
| JP | H0787829 | A | 4/1995 |
| JP | H0957213 | A | 3/1997 |
| JP | 5338984 | B2 | 11/2013 |
| JP | 6300571 | B2 | 3/2018 |
| KR | 100926534 | B1 | 11/2009 |
| KR | 20210035948 | A | 4/2021 |
| NL | 8600887 | A | 11/1987 |
| WO | 9111902 | A1 | 8/1991 |
| WO | 9300793 | A1 | 1/1993 |
| WO | 2006111619 | A1 | 10/2006 |
| WO | 2012161567 | A1 | 11/2012 |
| WO | 2019113691 | A1 | 6/2019 |
| WO | 2020097727 | A1 | 5/2020 |
| WO | 2020191483 | A1 | 10/2020 |

OTHER PUBLICATIONS

Cordis EU Project Champi-on 262037 Report, "Fully Automatic System for Picking and Handling Mushrooms for the Fresh Market: From the Growing Bed to the Cooling Storage," 2013, 5 pages. https://cordis.europa.eu/project/id/262037/reporting.

Galley, et al., "Pneumatic Hyperelastic Robotic End-Effector for Grasping Soft Curved Organic Objects," Electronic Thesis and Dissertation Repository, 2019, 143 pages. https://ir.lib.uwo.ca/etd/6392.

International Patent Application No. PCT/CA2021/000057, International Preliminary Report on Patentability, dated Feb. 15, 2024.

International Patent Application No. PCT/CA2021/000057, International Search Report and Written Opinion, dated Apr. 25, 2022.

Mushroom Technological Research Center of La Rioja (CTICH) Web page extract (English version), European Projects, Autol (La Rioja) Spain. https://www.ctich.com/.

New Zealand Patent Application No. 808264, Examination Report dated Mar. 5, 2024.

New Zealand Patent Application No. 813080, Patent Examination Report 1 dated Aug. 28, 2024.

Reed, et al., "AE—Automation and Emerging Technologies: Automatic Mushroom Harvester Development," Journal of Agricultural Engineering Research, 2001, vol. 78 (1), pp. 15-23.

Reliability, Safety, and Strength Realized in ATI's New PatentInnovative Robotic Tool Changer Design, ATI Industrial Automation, 2024. 02 Pages.

Screen Capture from YouTube Video Clip Entitled "Champi-ON Demo Video", 2 pages, uploaded on Sep. 17, 2013 by user Champi-ON Project Project. Retrieved from Internet: https://youtu.be/y44MyQ39d00.

TechBrew, "Changing the Mushroom Harvesting Business", made public by TechBrew Robotics on Apr. 21, 2021 (date verified by Google Wayback Machine), URL: https://web.archive.org/web/20210421150750/https://techbrew.com/mushroom-harvesting-roboV.

U.S. Appl. No. 18/512,597, Non-Final Office Action dated Aug. 7, 2024.

U.S. Appl. No. 18/512,597, Notice of Allowance dated Sep. 11, 2024.

European Patent Application No. 21095213.5, Extended European Search Report dated Nov. 13, 2024.

International Patent Application No. PCT/CA2024/051175, International Preliminary Report on Patentability, dated Nov. 8, 2024.

European Patent Application No. 24208796.3, Extended European Search Report dated Apr. 15, 2025.

European Patent Application No. 24209254.0, Extended European Search Report dated Apr. 15, 2025.

International Patent Application No. PCT/CA2024/051244, International Search Report and Written Opinion, dated Feb. 3, 2025.

International Patent Application No. PCT/CA2024/051246, International Search Report and Written Opinion, dated Dec. 17, 2024.

(56) References Cited

OTHER PUBLICATIONS

U.S. Appl. No. 18/512,597, Corrected Notice of Allowance dated Feb. 13, 2025.
U.S. Appl. No. 18/512,597, Notice of Allowance dated Dec. 4, 2024.
U.S. Appl. No. 18/512,597, Notice of Allowance dated Jan. 23, 2025.
U.S. Appl. No. 18/512,597, Notice of Allowance dated Nov. 7, 2024.
U.S. Appl. No. 18/904,925, Non-Final office Action dated Jan. 15, 2025.

* cited by examiner

MUSHROOM TRIMMING AND SORTING SYSTEM

FIELD

The present disclosure relates generally to techniques for the cultivation and harvest of agricultural crops, and in particular for the automated cultivation and harvest of mushrooms.

BACKGROUND

In typical commercial mushroom growing operations, mushrooms are grown in growing beds on the surface of casing soil over substrate in a series of weekly intervals called flushes. Each flush is picked several times per day over a five-day period, and typically two to three flushes are harvested. The size at which the mushrooms are picked depends on market requirements.

European and North American commercial production of button mushrooms typically occurs on "Dutch Style" substrate filled shelves, using a two or three flush cropping cycle. The substrate is typically a composted mixture of wheat straw, animal manure, and gypsum. The substrate is pasteurized, inoculated, and colonized with spawn of a selected mushroom strain. The substrate is covered with a casing soil of peat and lime mixture in a layer approximately 45 to 50 mm deep, which is then ruffled with compost added to the casing to mix mushroom mycelium into the casing.

Traditionally, commercial mushroom farm operations rely on manual labour to harvest the mushrooms. Manual labour is costly, however, and difficult to optimize. Mushrooms typically grow at such a rate that the mushrooms approximately double in size every 24 hours. Using manual labour, each flush is picked only two or three times per day for the duration of the flush, meaning that a mushroom bed may become overgrown between pickings due to the growth rate of mushrooms.

The automated mushroom harvesting apparatus and system by Bourdeau et al. disclosed in WIPO International Publication Number WO 2023/010198 A1, the entirety of which is incorporated herein by reference, solves many of the challenges associated with the automated picking of cultivated mushrooms.

The machine-learning virtualization-enabled harvesting technique by Mankowski et al. described in U.S. Provisional Patent Application No. 63/594,171 filed on Oct. 30, 2023, the entirety of which is incorporated herein by reference, also solves many of the challenges described above. A harvesting program system iteratively generates current harvesting programs for performance by harvesting equipment on a mushroom bed. The system receives current mushroom bed data corresponding to the mushroom bed including growing mushrooms at the current times. The system processes the current mushroom bed data using a mushroom bed model to generate current virtual mushroom beds corresponding to current states of the mushroom bed at the current times. The mushroom bed model is trained using labelled training mushroom bed data including known values of the mushroom bed, and using previously-generated virtual mushroom beds corresponding to predicted states of the mushroom bed. The system generates using the mushroom bed model predicted virtual mushroom beds corresponding to predicted states of the mushroom bed at future times. The system generates current harvesting programs based on the predicted virtual mushroom beds, and transmits them performance by the harvesting equipment on the mushroom bed.

The machine-learning-enabled tool changer for mushroom crop management system by Mankowski et al. described in U.S. Provisional Patent Application No. 63/551,215 filed on Feb. 8, 2024, the entirety of which is incorporated herein by reference, also solves many of the challenges described above. A robotic mushroom crop manager periodically or continuously receives mushroom bed data corresponding to a mushroom bed including growing mushrooms at a plurality of times. A trained mushroom bed model is used to process the mushroom bed data to generate mushroom bed state vectors respectively characterizing corresponding states of the mushroom bed at the plurality of times. Crop management equipment is controlled to perform a crop management program comprising a sequence of actions to be performed by crop management equipment comprising, for each current action in the sequence of actions, selecting, based on corresponding a current mushroom bed state vector, a selected crop management tool from a plurality of crop management tools. The crop management equipment is controlled to use the selected crop management tool to perform the current action on the mushroom bed.

The machine-learning enabled fungiculture thinning by Mankowski et al. described in U.S. Provisional Patent Application No. 63/652,955 filed on May 29, 2024, the entirety of which is incorporated herein by reference, also solves many of the challenges described above. A robotic mushroom crop manager periodically or continuously receives mushroom bed data corresponding to a mushroom bed including growing mushrooms at a plurality of times, and uses a trained mushroom bed model to process the mushroom bed data to generate mushroom bed state vectors respectively characterizing corresponding states of the mushroom bed. Control crop management equipment is used to perform a crop management program comprising a sequence of actions on the mushroom bed, the sequence of actions including culling actions on at least some of mushrooms determined for culling based on the mushroom bed state vectors. A trained mushroom thinning model determines mushrooms for culling based on the mushroom bed state vectors, and/or mushrooms are determined for culling when a stem-cap growth rate ratio exceeds a preconfigured threshold. An end effector for culling mushrooms has a minimum probe height-width ratio to able culling without contacting or damaging neighbouring mushrooms.

There remains, however, a need for improved techniques to optimize the total yield and overall effectiveness of automated mushroom cultivation and harvest systems which addresses at least some of the shortcomings of previous solutions and provides yet further advantages, thereby providing a material value over prior techniques.

BRIEF DESCRIPTION OF THE DRAWINGS

Embodiments will now be described, by way of example only, with reference to the attached Figures.

Figure 1:
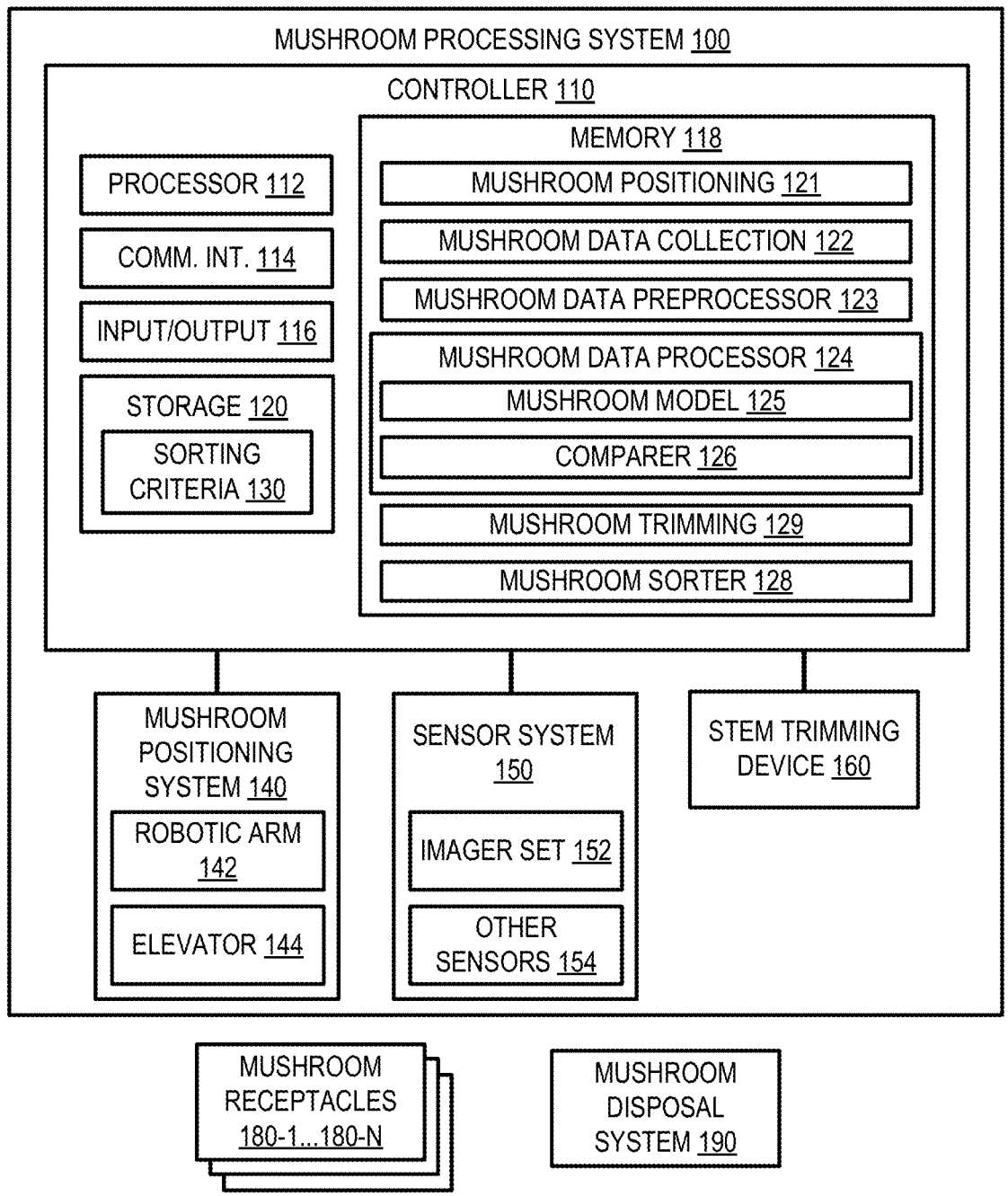
FIG. 1 is block diagram of a mushroom processing system.
Figure 2:
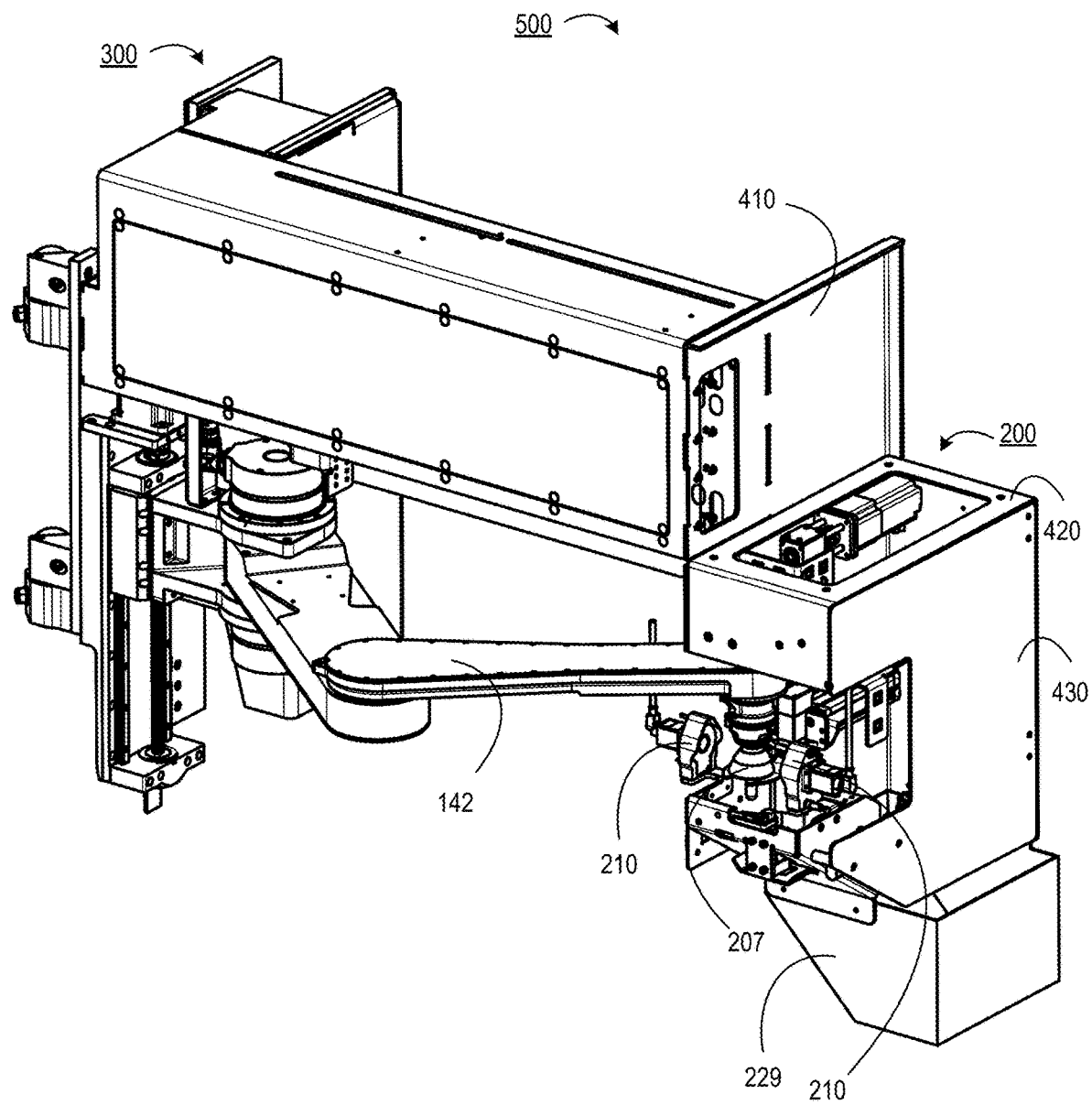
FIG. 2 is a perspective view of a selective compliance assembly robot arm (SCARA) system and mushroom processing station.
Figure 3:
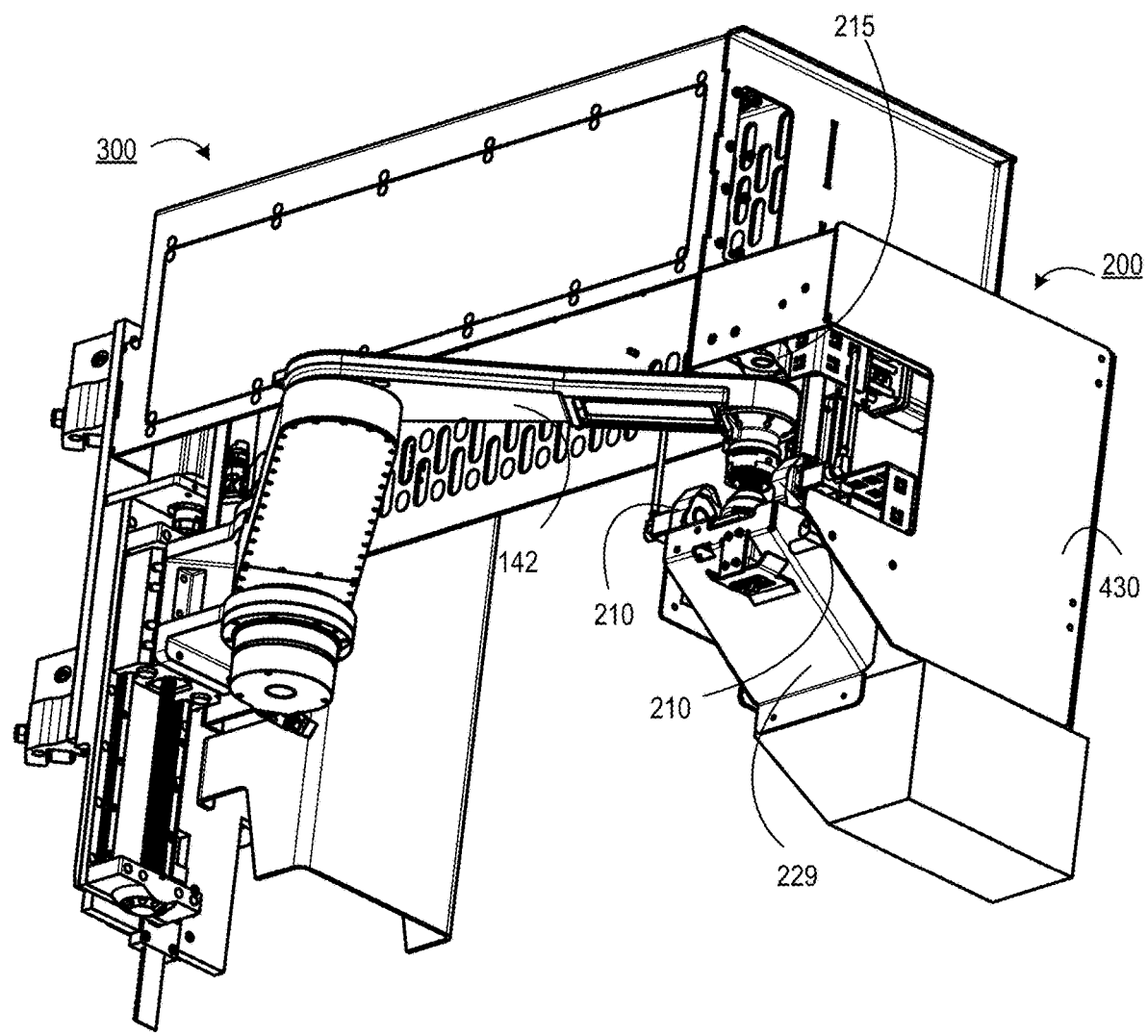
FIG. 3 is a further perspective view of the SCARA system and mushroom processing station of FIG. 2.
Figure 4:
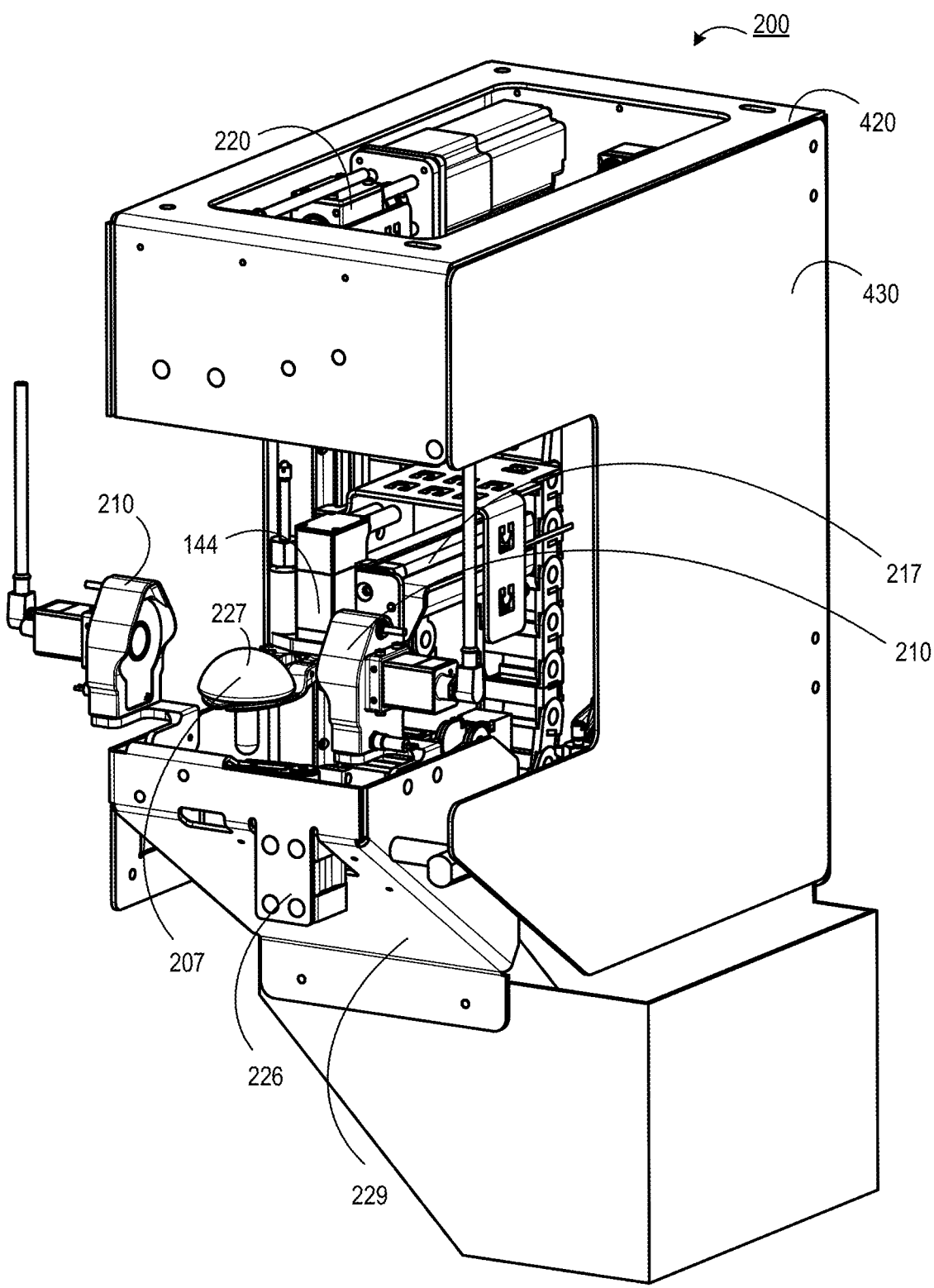
FIG. 4 is a perspective view of the mushroom processing station of FIG. 2 showing a gripped mushroom.
Figure 5:
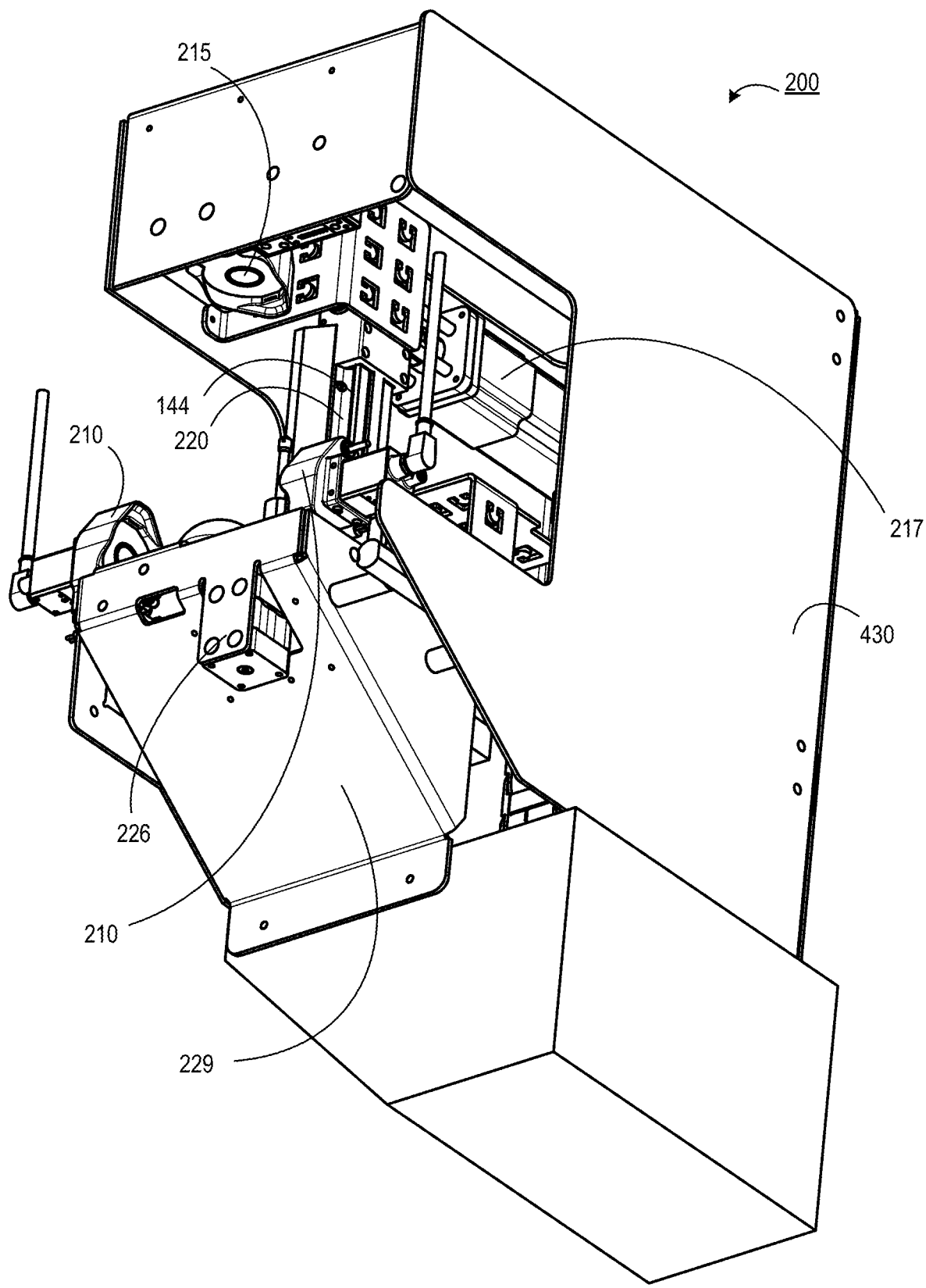
FIG. 5 is a further perspective view of the mushroom processing station of FIG. 4.
Figure 6:
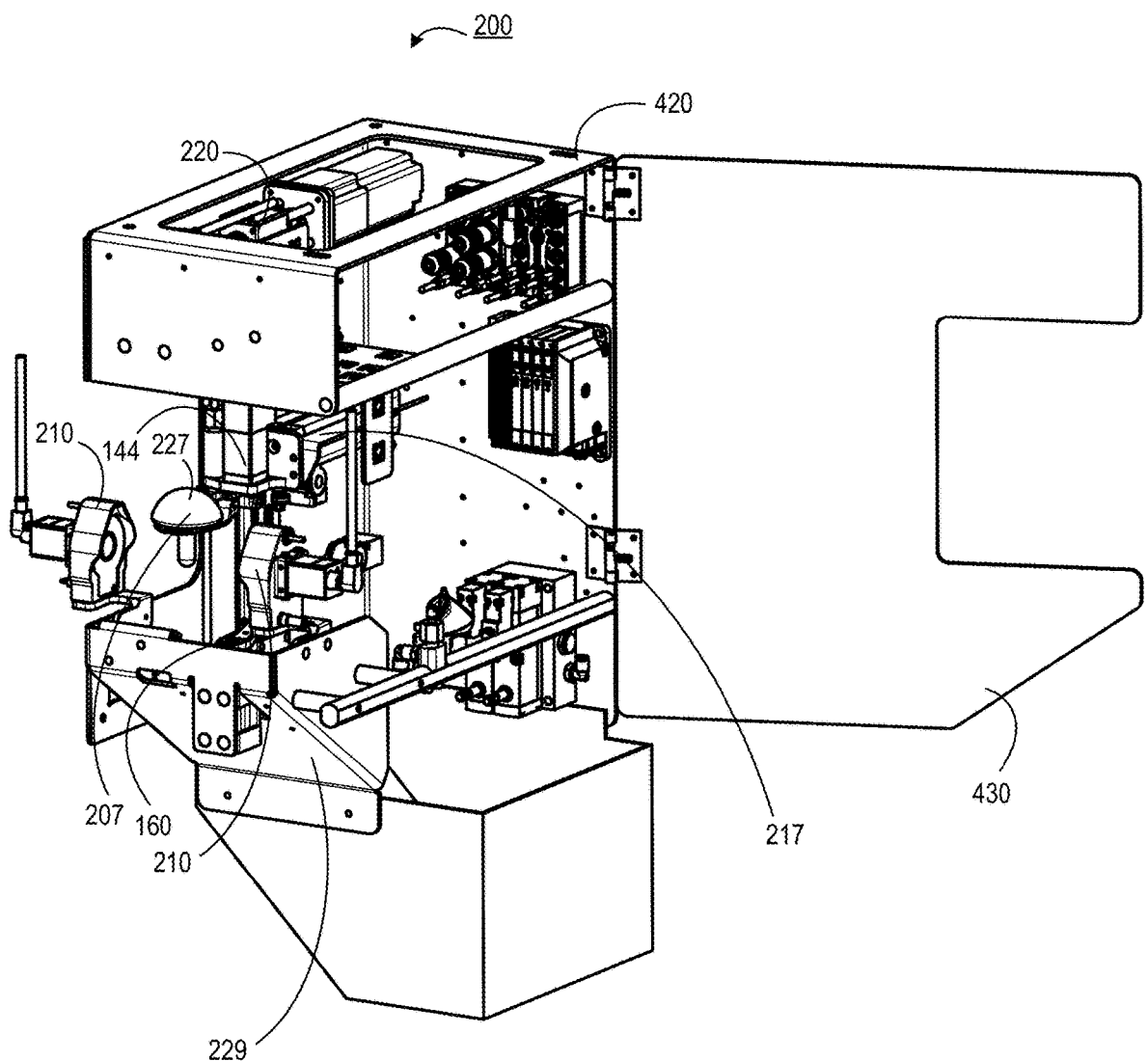
FIG. 6 is a perspective of the the mushroom processing station of FIG. 4 with an access door open.
Figure 7:
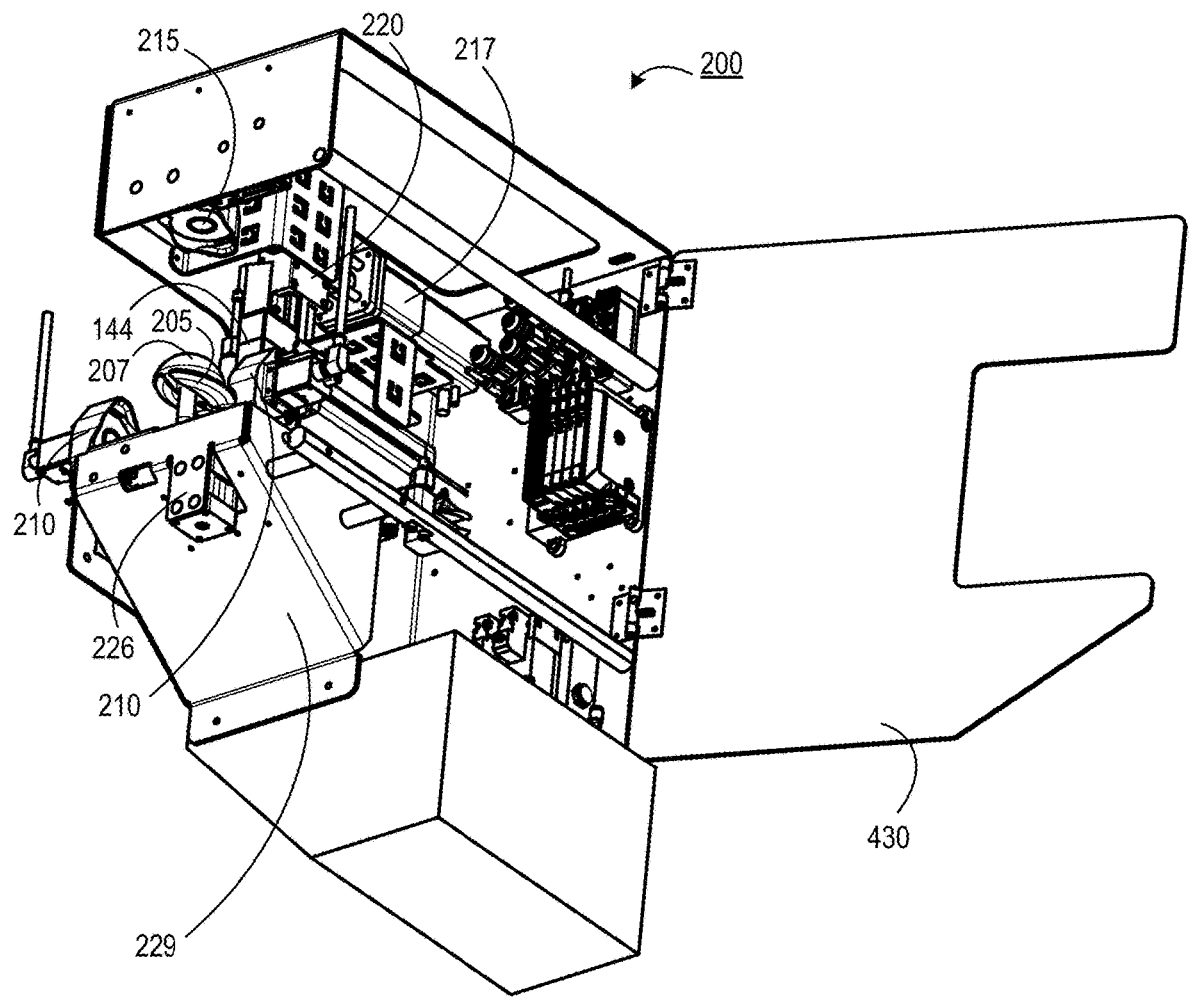
FIG. 7 is a further perspective view of the mushroom processing station of FIG. 6.

It is to be understood that the accompanying drawings are used for illustrating the principles of the embodiments and exemplifications of the subject-matter discussed herein. Hence the drawings are illustrated for simplicity and clarity, and not necessarily drawn to scale and are not intended to be limiting in scope. Reference characters/numbers are used to depict the elements of the subject-matter discussed that are also shown in the drawings. The same reference characters/numbers are given to a corresponding component or components of the same or similar nature, which may be depicted in multiple drawings for clarity. In particular, specific embodiments or categories of embodiments of an element designated by a particular reference character may be distinguished by means of a suffix, wherein the specific embodiment designated by a reference character having a suffix is a species of the more general element having the same reference character lacking the suffix. For example, an element shown in the drawings and designated by the reference character ###n is a species of the more general element designated by reference character ###, and thus possesses all of the features of the more general element. Text may also be included in the drawings to further clarify certain principles or elements of the invention. It should be noted that features depicted by one drawing may be used in conjunction with or within other drawings or substitute features of other drawings. It should further be noted that common and well-understood elements for creating a commercially viable version of the embodiments discussed herein are often not depicted to facilitate a better view of the principles and elements of the subject-matter discussed herein. Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DESCRIPTION

Improved techniques for automated cultivation of mushrooms are disclosed herein. More particularly, improved techniques for automated trimming of mushroom stems, and automated assessment and sorting of trimmed mushrooms, are disclosed herein. The techniques include a mushroom trimming and sorting system including a mushroom processing station having or interfaced with a controller and operable automatically to trim individual mushroom stems and to assess and sort trimmed mushrooms, in order to optimize productivity of mushroom growing operations.

The commercial value of harvested mushrooms depends on a number of factors, including, among other things, the size of the mushroom and the cleanliness of the remaining stem following trimming. When mushrooms are harvested by pulling them out of the growing medium, at least some quantity of soil typically remains adhered to a lower end of the stem. The stem is then trimmed to remove the lower portion of the stem having soil adhered to it. The stem may also be trimmed to remove the lower portion to the extent that it includes defects apart from adhered soil. While it is desirable to trim the stem so that no adhered soil or other defects remain on the harvested mushroom, it is simultaneously desirable to remove as little of the stem as possible in order to maximize the finished mushroom weight. In some cases, it is desirable to trim the stem to a predetermined length, which may depend on a size of the cap, in order to produce finished mushrooms with desirable proportions.

Thus, the mushroom processing system disclosed herein employs machine-learning controlled robotics and computer vision systems to optimize the trimming of mushroom stems, including to eliminate or minimize the amount of soil or other defects remaining on the trimmed mushroom while maximizing the retained stem length.

The commercial value of harvested mushrooms also depends on other factors, including, among other things: the size (e.g. diameter) of the mushroom cap; the circular symmetry of the cap; the degree of damage, if any, to the cap; and the degree of opening of the gills of the cap. In particular, mushrooms tend to have greater commercial value when: the cap has a larger diameter; the cap has greater circular symmetry; the cap has less damage; and the gills are more closed.

Thus, the mushroom processing system disclosed herein employs machine-learning controlled robotics and computer vision systems to quickly and automatically assess mushrooms on an individual, mushroom-by-mushroom basis, on at least some of the foregoing factors, to optimize selection and sorting of mushrooms, to maximize overall productivity of a mushroom bed.

System Overview

With reference to FIG. 1, a mushroom processing system 100 may have a controller 110 communicatively coupled with a mushroom positioning system 140, a sensor system 150, and a stem trimming device 160. The controller 110 may have a processor 112, a communications interface 114, an input/output system 116, a memory 118, and a storage 120. The controller 110 may be configured to control the mushroom positioning system 140, the sensor system 150, and the stem trimming device 160 to perform the functionality described herein. More particularly, the processor 112 may be operable to perform computer-readable instructions stored in the memory 118, which may be by performing specific modules 121, 122, 123, 124, 128, 129, and which may include accessing data structures stored in the storage 120, to perform the functionality described herein. The mushroom processing system 100 may further have or cooperate with one or more mushroom receptacles 180-1 . . . 180-N and a mushroom disposal system 190.

In particular, controller 110 may be operable to control the mushroom positioning system 140 to move and selectively position an individual mushroom relative to the sensor system 150 for sensing of the mushroom by the sensor system 150 sufficient to perform the functionality described herein. Additionally, the controller 110 may be operable to control the mushroom positioning system 140 to move and selectively position the individual mushroom relative to the stem trimming device 160 for controlled trimming of a stem of the mushroom by the stem trimming device 160. The controller 110 may further be operable to control the mushroom positioning system 140 to move and selectively position the individual mushroom for any desired purpose, which may include, among other things, to deposit the mushroom in a selected mushroom receptacle 180-1 . . . 180-N, or to discard the mushroom, which may be by using the mushroom disposal system 190.

More particularly, the sensor system 150 may include an imager set 152, which may include one or more imagers, which may include one or more optical imagers, which may include one or more digital cameras, although alternatives are possible and contemplated. One or more of the imagers may be a visible light imager, and one or more other images may be non-visible light imagers, e.g. infrared or ultraviolet, ultrasonic, LIDAR, or other imagers.

Following harvesting of a mushroom from a mushroom bed, the processor 112 may be operable to control the mushroom positioning system 140, which may be by operating a mushroom positioning module 121, for moving and positioning the mushroom relative to the imager set 152, and to control the imager set 152 for imaging of the mushroom by the imager set 152, which may be by operating a mushroom data collection module 122, including imaging one or more of the cap, the stem, and the gills of the mushroom. The processor 112 may further be operable to pre-process mushroom data, including images generated by such imaging, which may be by operating a mushroom data preprocessor 123, to generate preprocessed images, including, without limitation, one or more of augmenting, enhancing, colour-correcting, converting, or compressing such images.

The processor 112 may further be operable to process the images (or pre-processed images, as the case may be), which may be by using a mushroom data processor 124, to identify, determine, or parameterize based on such images any specified properties and characteristics of the mushroom (hereinafter "mushroom properties"). The processor 112 may further be operable to do any of foregoing on the basis not only of the described images, but also on the basis of further data collected or determined in relation to the images. For this purpose the sensor system 150 may include other sensors 154, which may include one or more other types of sensors, which may include, without limitation: position sensors; motion sensors; orientation sensors; air temperature sensors; air humidity sensors; and light sensors. In some embodiments, at least some of the other sensors 154 are coupled with or form a part of the mushroom positioning system 140, whereas in other embodiments they are separate from the mushroom positioning system 140. For example, the controller 110 may be operable to control the mushroom positioning system 140 and/or the sensor system 150 to measure or determine a spatial position and/or orientation of the mushroom, which may be by using one or more position and/or orientation sensors of or coupled with the mushroom positioning system 140 and/or the sensor system 150, and the processor 112 may further be operable to identify, determine, or parameterize any of the mushroom properties based also on such measured or determined spatial position and/or orientation. Different and further data collected or determined in relation to the images is possible and contemplated. The images (or pre-processed images, as the case may be) and such further data may collectively be designated "mushroom data", and the processor 112 may be operable to process the mushroom data, which may be by using the mushroom data processor 124, to identify, determine, or parameterize based therefore any of the mushroom properties.

Mushroom Model

In particular, for the purpose of identifying, determining, or parameterizing the mushroom properties based on the mushroom data, the processor 112 may be operable to train and operate a mushroom model 125. In particular, the mushroom data may include or be processed to include mushroom data vectors configured for ingestion by the mushroom model 125. The mushroom data vectors may include or enable determination of any quantifiable properties or characteristics of mushrooms as described herein, including the mushroom properties. When the mushroom data is or includes images, including position-indexed and/or time-indexed images, as described herein, the mushroom data vectors may be or include the images in any suitable encoding, which may include or be labelled by, which may be by metadata, corresponding locations, orientations, and/or times. Any suitable object-detection techniques or metrics may be used, which may include intersection-over-union similarity measures, although alternatives are possible and contemplated. For example, one non-limiting mushroom data vector includes any combination of at least some, or all, of the following attributes: mushroom images; position and/or orientation; time stamp; window size; light configuration (e.g. RGB values); distance/depth (which may be in combination with light configuration as RGB-D values); motion quantities (which may be speed, velocity, inertia values of camera, sensors, or related structure); and environmental data (such as moisture, temperature, surface substrate quality; substrate grade). Other quantities and measures are possible and contemplated.

The processor 112 may be operable to train the mushroom model 125 using a comparer 126. In an initial training stage, known mushroom state vectors encoding the properties and characteristics of the mushroom, associated with particular mushroom data, may be determined by a separate procedure. By way of non-limiting example, the known mushroom state vectors may be determined by manual inspection. Alternatively, synthetic mushrooms fabricated purposefully to correspond to preconfigured mushroom state vectors encoding a predetermined variety of mushroom properties and characteristics may be used. In any case, the mushroom data so received and generated may include or be labelled with the known mushroom state vectors. The mushroom model 125 may then process such labelled mushroom data vectors using the comparer 126 to determine differences between the known mushroom state vectors and the predicted mushroom state vectors generated by the mushroom model 125 based on the received mushroom data, to learn to predict the corresponding known mushroom state vectors, and thus the known mushroom state. In particular, the mushroom data may include images of mushrooms having different states of soil presence or other defects on the stem, and the known mushroom state vectors may encode these different states of soil presence or other defects.

The processor 112 may be operable to train the mushroom model 125 using any suitable techniques known in the art. A network architecture or topology may be established, and layers may be added which are associated with respective optimization functions, activation functions, and/or loss functions. One or more artificial neural networks may be used, and each may of any suitable type, including without limitation convolutional neural networks, recurrent neural networks, and deep learning neural networks. The mushroom model 125 may involve one artificial neural network, or may involve multiple different artificial neural networks. The mushroom model 125 may include instructions using supervised or unsupervised machine learning, involving identifying and recognizing patterns in the mushroom data (in the form of the mushroom data vectors) to enable recognition of mushroom states of the mushroom. The mushroom data and the differences between the actual and predicted mushroom state described herein which may be used to train the artificial neural network may be encoded in any suitable manner, such as, without limitation, an N-dimensional tensor, a matrix, or an array. Training may be performed in any suitable manner, and may include iterative training using labeled training data as described herein. Training of the artificial neural network may involve parameters initialized to random values, which are changed with each iteration, using any appropriate algorithm, such as a gradient descent algorithm, to converge to predetermined values. Training of the artificial neural network may employ any appropriate statistical model, which may be a multinomial logistic regression model, a random forest model, a decision tree, a logistic regression model, or a gradient boosting model.

In some embodiments, the mushroom model is a part, an aspect, a component, or cooperates with, one or more of the models disclosed and described in U.S. Provisional Patent Application No. 63/594,171 filed on Oct. 30, 2023, U.S. Provisional Patent Application No. 63/551,215 filed on Feb. 8, 2024, and/or U.S. Provisional Patent Application No. 63/652,955 filed on May 29, 2024, the disclosures of which are incorporated herein by reference.

In this way, the mushroom model 125 may be trained to predict preconfigured parameters of individual mushrooms based on provided mushroom data including image and optionally other sensor data, including a state of soil presence or other defects on the stem.

Mushroom Trimming

As discussed above, the controller 110 may be operable to control the mushroom positioning system 140 to move and selectively position an individual mushroom relative to the stem trimming device 160 for controlled trimming of a stem of the mushroom by the stem trimming device 160, and in particular to do so in order to trim a lower end of the mushroom stem having soil adhered to it, or which is characterized by other defects, while retaining as much of the stem as possible, or to trim the mushroom stem to a predetermined length, which may depend on a size of the cap. To this end, the processor 112 may further be operable to control the mushroom positioning system 140 and the stem trimming device 160 to trim a predetermined length of the lower end of the mushroom stem, which may be based on a determination of that portion of the mushroom stem having soil adhered to it, or which is characterized by other defects.

In particular, the controller 110 may be operable to control the mushroom positioning system 140 and the sensor system 150 to collect mushroom data of the mushroom, and the processor 112 may be operable to use the mushroom data processor 124, which may be by using the mushroom model 125, to generate mushroom properties of the mushroom, which may include a length of the stem, and which may also include presence of soil or other defects on the stem, which may include a distance below an underside of the cap shape where the presence of soil or other defects on the stem begins. Based on such mushroom properties, the controller 110 may be operable to control the stem trimming device 160, which may be by the processor 112 performing a mushroom trimming module 129, to trim the mushroom stem at a predetermined length of the lower end of the mushroom stem based on the determined mushroom properties. Such determination may include addition of a pre-configured buffer length beyond the determined length of the lower end of the mushroom stem to which soil is adhered or other defects are present, which buffer length may be determined by any suitable method. Moreover, where the mushroom properties are determined by the mushroom data processor 124 using the mushroom model 125, the processor 112 may be further operable to collect post-trimming mushroom data after the mushroom stem is trimmed using the stem trimming device 160, and the post-trimming mushroom data may be used to further train the mushroom model 125. In this way, the mushroom model 125 may be progressively trained over time to determine an optimal lower stem length to trim.

Mushroom Sorting

In addition, the processor 112 may further be operable to sort mushrooms in accordance with the mushroom properties determined as described herein. In particular, the processor 112 may be operable to sort mushrooms, which may be by performing a mushroom sorter module 128, in accordance with any pre-configured sorting criteria, which may be stored in the storage 120 and encoded in a storage criteria data structure 130. The sorting criteria may include any criteria with which any of the determined mushroom properties may be compared in order to determine compliance of the mushroom properties with the criteria. By way of non-limiting example, the mushroom criteria may include: one or more categories of mushroom cap dimensions, which may include cap width or diameter; one or more categories of mushroom cap shape; one or more categories of mushroom cap colour; one or more categories of dimensions of the stem, which may include stem width or length; one or more categories of orientation of the stem relative to the cap, which may include an angle relative to a plane of an underside of the cap; one or more categories of a quantity of soil on the stem; one or more categories of a degree of gill opening; one or more categories of a quantity or kind of defects or marks; and one or more categories of surface texture. Where, for any given mushroom property, the mushroom criteria defines only a single category, it may constitute a definition distinguishing a pass/fail condition with that mushroom criteria.

The processor 112 may thus be operable to determine inclusion and/or exclusion of a given mushroom with any pre-configured mushroom criteria category, and in this way generate mushroom sorting parameters. In particular, the processor 112 may be operable to do so post-trimming. The processor 112 may further be operable, which may be by performing the mushroom sorter module 128, to control the mushroom positioning system 140 to move and deposit the mushroom in a selected mushroom receptacle 180-1 . . .

180-N, or to discard the mushroom, which may be by using the mushroom disposal system 190, based on the determined inclusion and/or exclusion of the mushroom with any pre-configured mushroom criteria category. The processor 112 may thus be operable to sort mushrooms and deposit them into corresponding different mushroom receptacles 180-1 . . . 180-N based on any one or more of the mushroom properties described herein. For example, the processor 112 may be operable to sort and deposit mushrooms into corresponding different mushroom receptacles 180-1 . . . 180-N based on any of the criteria or categories described herein. The processor 112 may further be operable, which may be by performing the mushroom sorter module 128, to determine derivative properties of the mushroom based on any of the mushroom properties, which may include, for example, a quality grade, and may likewise be operable to sort and deposit mushrooms into corresponding different mushroom receptacles 180-1 . . . 180-N based on such derivative properties. The sorting criteria data structure 130 may likewise store derivative properties criteria on the basis of which the processor 112 determines such derivative properties based on the determined mushroom properties.

Mushroom Processing Station

One non-limiting embodiment of at least parts of the mushroom processing system 100 is shown in FIGS. 2-13. It may take the form of a mushroom processing apparatus 400 including a mushroom processing station 200 which may cooperate with a mushroom conveyancing system. In the present example, the mushroom conveyancing device includes a selective compliance assembly robot arm (SCARA) system 300, although alternatives are possible and contemplated. The SCARA system 300 has a robotic arm 142, and as shown and discussed below the mushroom processing station 200 has a mushroom elevator 144. The robotic arm 142 and the mushroom elevator 144 may form parts of the mushroom positioning system 140. To this end, the mushroom processing station 200 and the SCARA system 300 may be communicatively coupled with and controlled by the controller 110. In operation, harvested mushrooms may be moved individually, one-at-a-time, to the mushroom processing station 200 using SCARA system 300 as further described, for performance of the functionality as discussed, including use of the stem trimming device 160 to trim the mushroom stem, and then moved elsewhere afterward by the SCARA system 300, such as to one of the mushroom receptacles 180-1 . . . 180-N or to the mushroom disposal system 190.

With reference to FIGS. 8-11, the robotic arm 142 may have an end effector 310 sized, shaped, and configured selectively to hold a mushroom 207. The robotic arm 142 and end effector 310 may have any necessary or desirable parts, configurations, or properties to perform the functionality described herein. In particular, SCARA system 300, the robotic arm 142, and the end effector 310 may be or include a SCARA system, robotic arm, or end effector as described in WIPO International Publication Number WO 2023/010198 A1 and/or U.S. Provisional Patent Application No. 63/551,215 filed on Feb. 8, 2024, the disclosures of which are herein incorporated by reference in their entirety. In particular, the end effector 310 may be or include a suctioning gripper operable to grip the mushroom 207 by means of selective vacuum suctioning of an upper portion of the mushroom cap 227 as described in the specified references.

With reference to FIGS. 4-13, the mushroom elevator 144 may include a mushroom gripper 205 operable selectively to grip the mushroom 207, a horizontal linear actuator 217 operable selectively to position the mushroom gripper 205 horizontally, and a vertical linear rail system 220 coupled with the horizontal linear actuator 217 and operable selectively to raise and lower the horizontal linear actuator 217, and thus the mushroom gripper 205. In some embodiments, the vertical linear rail system 220 is substantially similar to, includes components of, or cooperates with, the linear rail system, carriage, and/or adjustable roller assembly disclosed and described in U.S. patent application Ser. No. 18/749,894, the disclosure of which is incorporated herein in its entirety. As described above, the robotic arm 142 and the mushroom elevator 144, being parts of the mushroom positioning system 140, may be coupled for control by the controller 110 to perform the functionality described herein.

In this embodiment the imager set 152 includes a plurality of digital cameras including a pair of side view cameras 210 and a top view camera 215. As shown, the side view cameras 210 and the top view camera 215 are positioned to provide side views and a top view, respectively, of the mushroom gripper 205, and thus a mushroom 207 gripped by the mushroom gripper 205. In particular, the side view cameras 210 may have a field of view angle sufficient to encompass the mushroom gripper 205, and thus a gripped mushroom 207, within a preconfigured vertical position relative to the side view cameras 210. Similarly, the top view camera 215 may have a field of view angle sufficient to encompass the mushroom gripper 205, and thus a gripped mushroom 207, within a preconfigured horizontal position relative to the top view camera 215. In different embodiments, the side view cameras 210 have a field of view angle of from about 45° to about 120°, or about 90°. In different embodiments the top view camera 215 has a field of view angle of from about 45° to about 120°, or about 90°.

Figure 8:
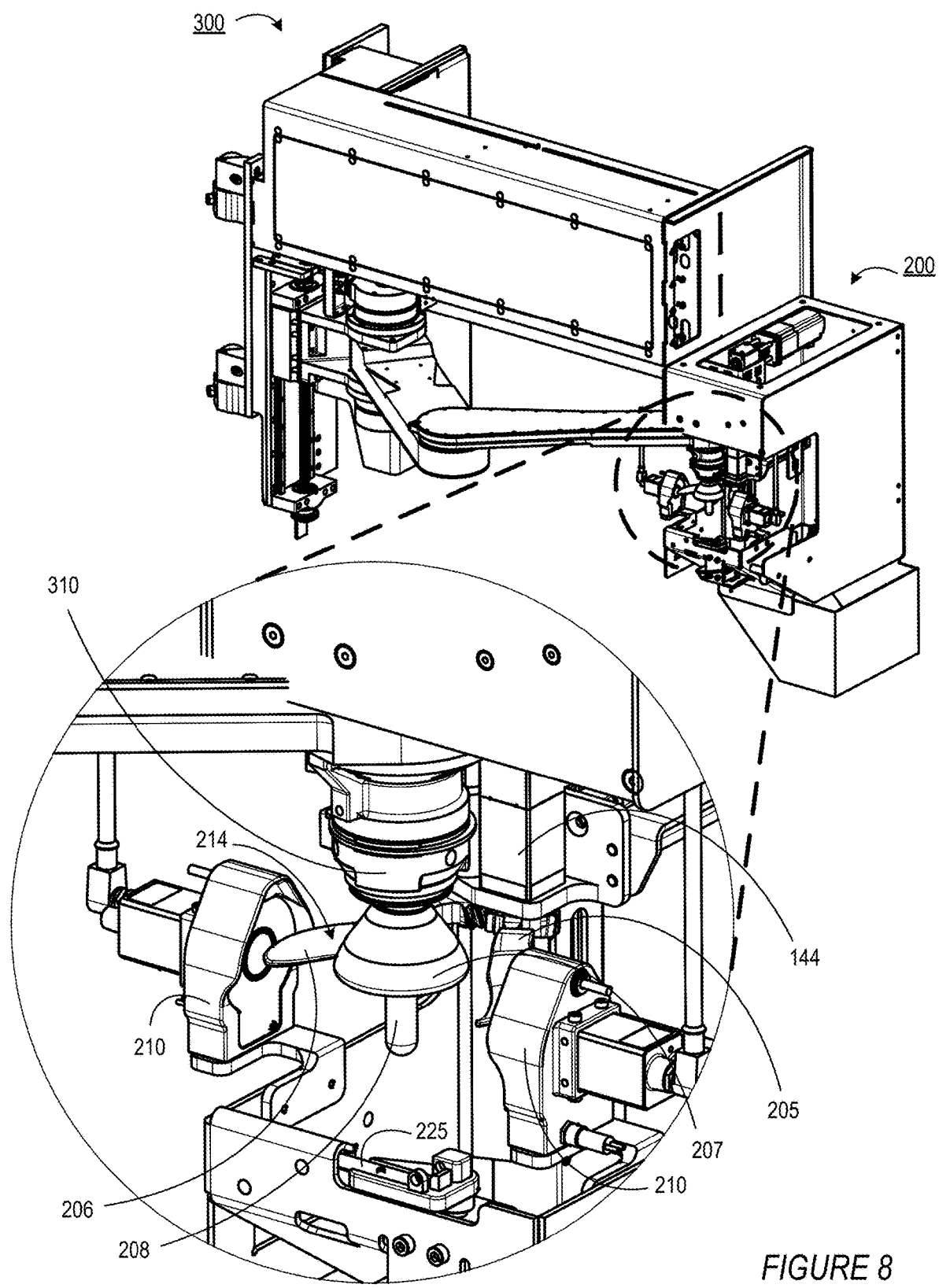
FIG. 8 is a perspective view of the SCARA system and mushroom processing station of FIG. 2 with an enlarged view showing a mushroom positioned for gripping by open mandibles of a mushroom elevator gripper.
Figure 13:
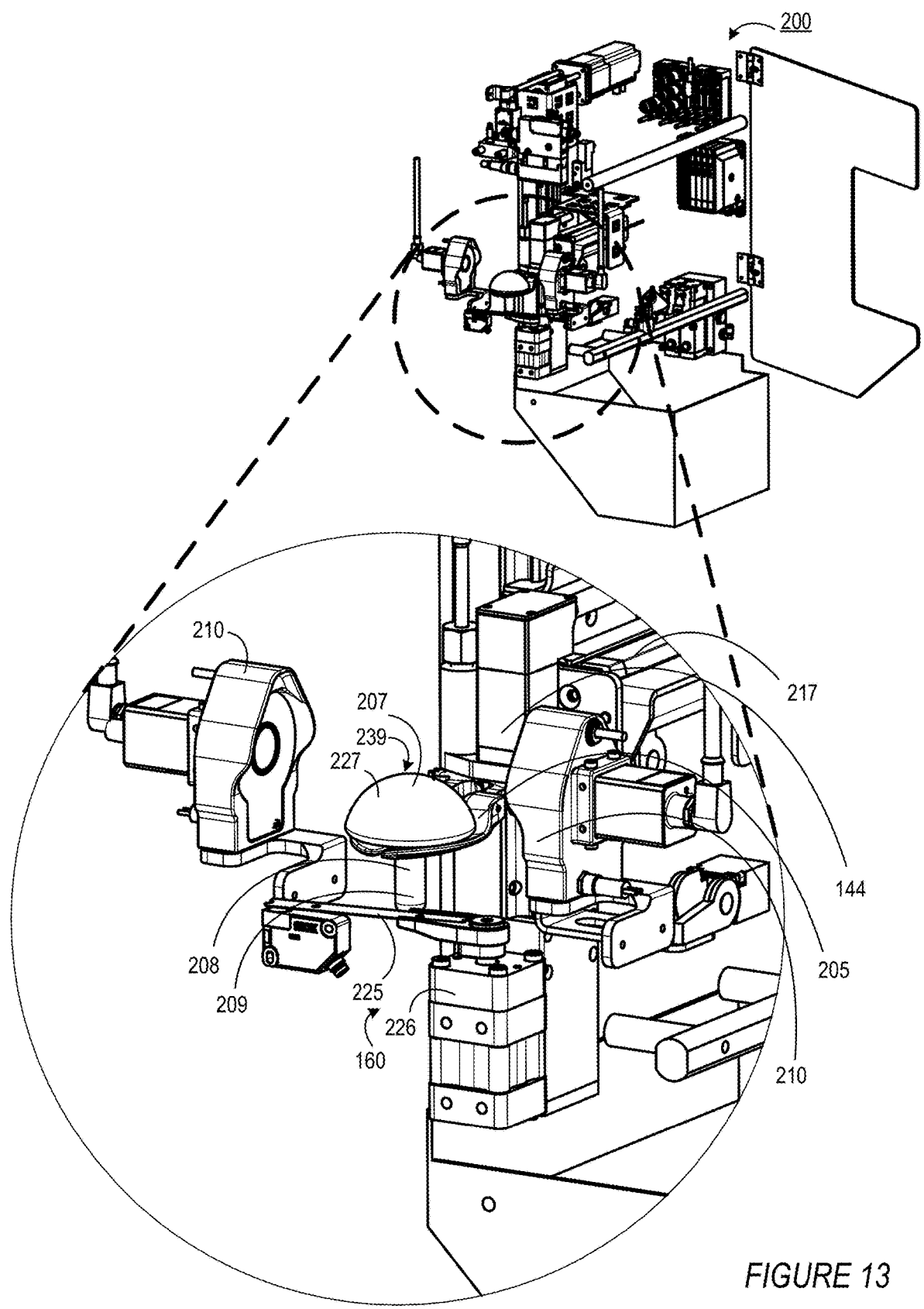
FIG. 13 is a perspective view of the mushroom processing station of FIG. 2 with an enlarged view showing a mushroom gripped by closed mandibles of the mushroom elevator gripper, omitting a housing the mushroom processing station to provide a view of a stem trimming device including a trimming blade mounted to a trimming blade actuator.

As shown particular in FIGS. 8 & 13, the stem trimming device 160 may include a trimming blade 225 mounted to a trimming blade actuator 226 positioned proximal a lower end of the mushroom elevator 144 above a debris chute 229 sized, shaped, configured, and positioned to catch portions of the mushroom 207 trimmed using the trimming blade 225. The trimming blade 225 and/or the debris chute 229 may also form a part of the mushroom disposal system 190 when present.

Figure 9:
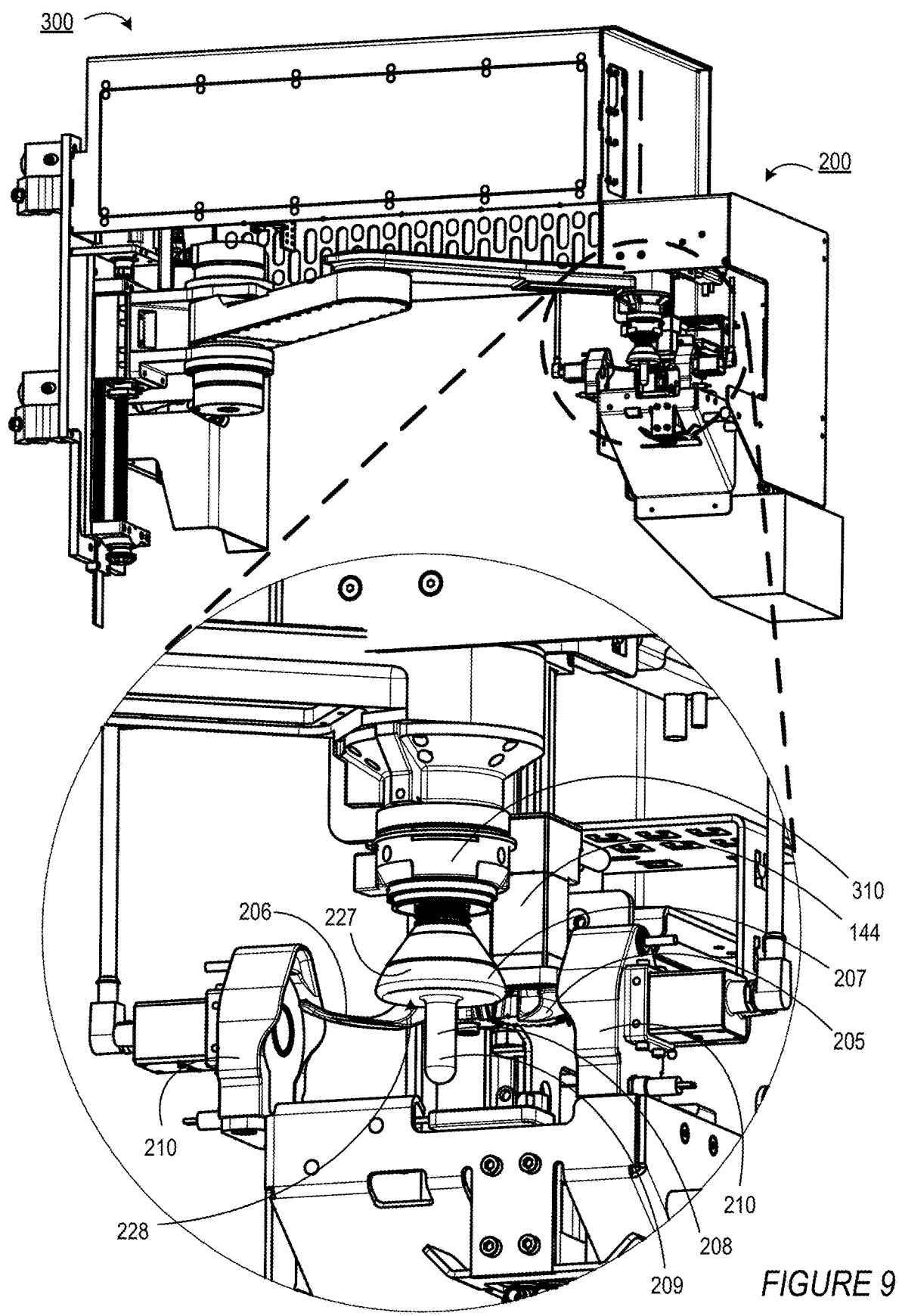
FIG. 9 is a further perspective view of the SCARA system and mushroom processing station of FIG. 8.
Figure 10:
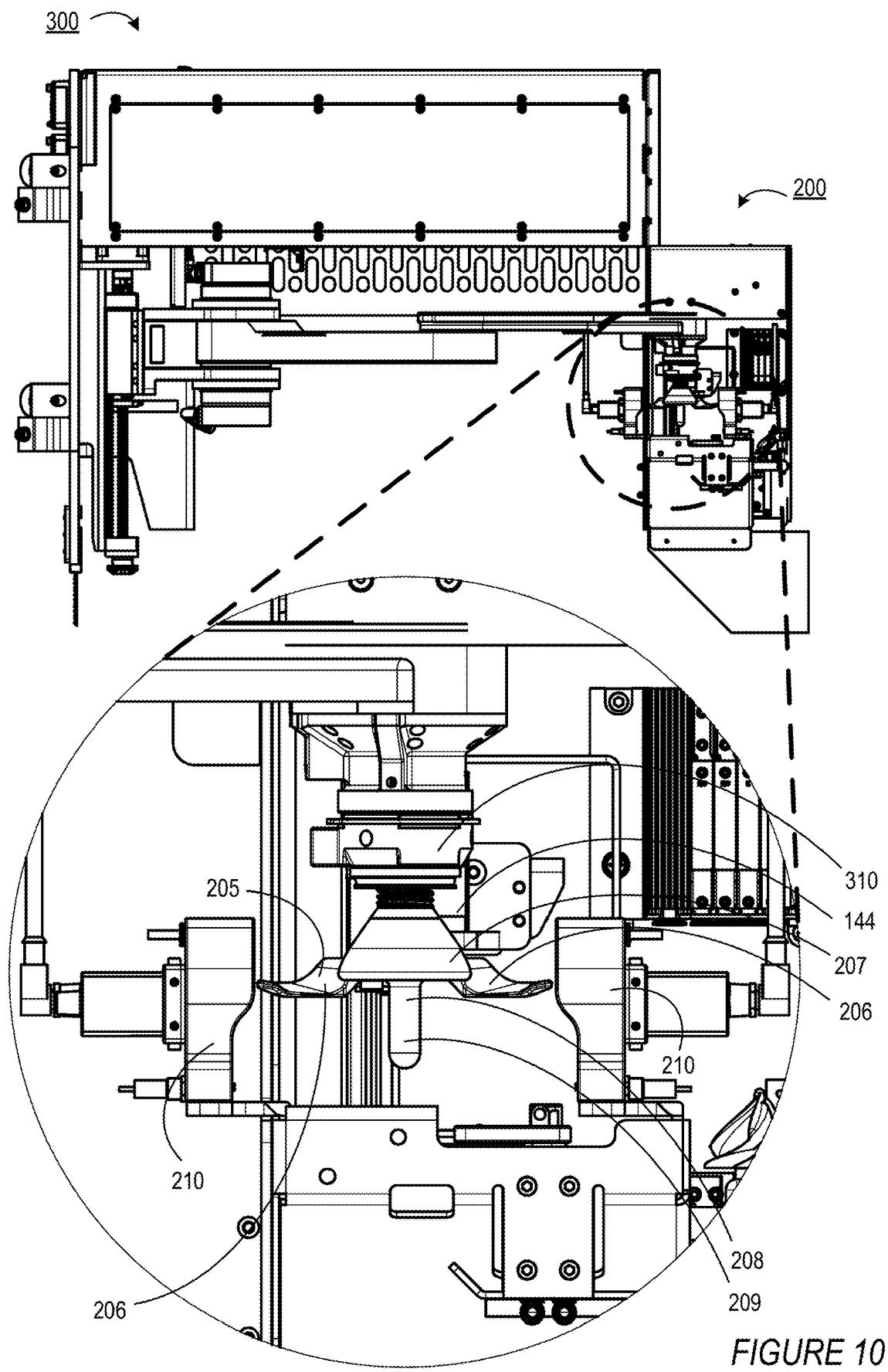
FIG. 10 is an elevation view of the SCARA system and mushroom processing station of FIG. 8.
Figure 14:
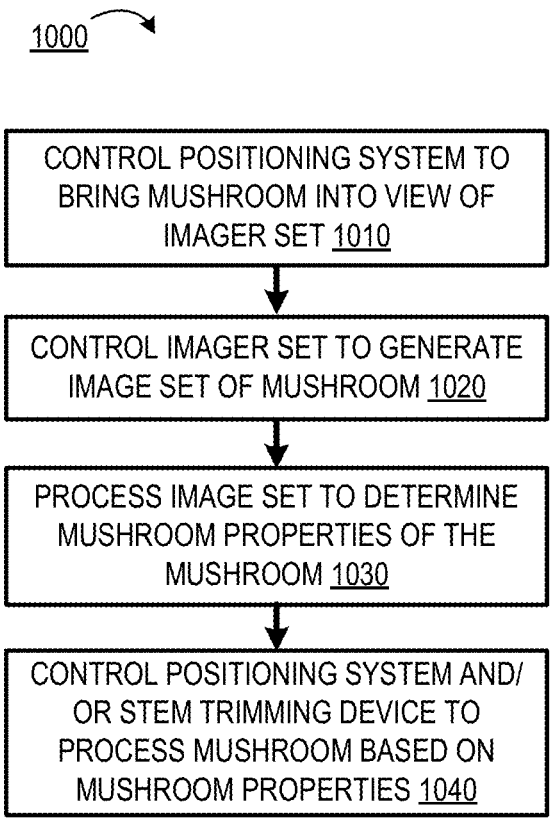
FIG. 14 is a flowchart of a method of mushroom processing.

Thus, and with reference to FIG. 14, the mushroom processing system 100 may be operable to perform a method 1000, as follows. As shown in FIGS. 8-10, the controller 110 may operate the mushroom elevator 144 to position the mushroom gripper 205 in an open state ready to receive a mushroom 207. In the open state, mandibles 206 of the mushroom gripper 205 may be respectively rotated outwardly, to separate and open the mandibles 206. The controller 110 may then operate the robotic arm 142 to transport the mushroom 207 to the mushroom gripper 205. Optionally, just prior to the method 1000, the controller 110 may operate the robotic arm 142 using the end effector 310 to harvest the mushroom 207 from a mushroom bed, which may be by suction-gripping the mushroom 207 at the upper surface 239 of the mushroom cap 227 and raising it from the mushroom bed, such that a mushroom stem 208 of the mushroom 207 has soil adhered to or is characterized by other defects on a lower portion 209 thereof. In particular, and as shown particularly in FIGS. 8-10, the controller 110 may operate the robotic arm 142 to position the mushroom 207 proximal the mushroom gripper 205 and relative to the side view cameras 210 such that, given a field of view angle of the side view cameras 210, the side view cameras 210 have a view of both the mushroom stem 208 of the mushroom 207 as well as an underside 228 of the mushroom cap 227 of the mushroom 207, so as to provide a view of the gills of the mushroom 207. The ability of the side view cameras 210 to capture images of the underside 228 of the mushroom cap 227 may be enabled or facilitated by the open state of the mushroom gripper 205. In particular, opening the mandibles 206 of the mushroom gripper 205 may provide or facilitate providing the side view cameras 210 with an unobstructed view of the underside 228 of the mushroom cap 227, and thus the gills of the mushroom 207. The controller 110 may then operate the side view cameras 210 to capture first images of the mushroom 207 including the mushroom stem 208 and underside 228, including the gills, which may form a part of the mushroom data described above. Thus, the method 1000 includes step 1010 of controlling the positioning system 140 to bring the mushroom into view of the imager set 152, and step 1020 of controlling the imager set 152 to generate an image set of the mushroom. As described above, it may be so by the processor 112 operating the mushroom positioning module 121, and the mushroom collection module 122 to control the mushroom positioning system 140 and the sensor system 150.

The controller 110 may then operate the mushroom data processor 124 on the collected first images of the mushroom 207 to generate first mushroom properties of the mushroom 207 including dimensions of the cap, which may include cap width or diameter; dimensions of the stem, which may include stem width or length; orientation of the stem relative to the cap, which may include an angle relative to a plane of an underside of the cap; and presence of soil or other defects on the stem, which may include a distance below an underside of the cap where the presence of soil or other defects on the stem begins. Optionally, the controller 110 may first preprocess the images, which may be by operating the mushroom data preprocessor 123, as described. Thus, the method 1000 includes step 1030 of processing the image set to determine mushroom properties of the mushroom.

The controller 110 may then operate the mushroom elevator 144 and robotic arm 142 in concert to position the mushroom 207 relative to the mushroom gripper 205 based on the mushroom properties thus determined, in order to position the mushroom 207 relative to the mushroom gripper 205 such that, as shown especially in FIGS. 8-10, the mushroom stem 208 is centered between opposing mandibles 206 of the mushroom gripper 205, and the underside 228 of the mushroom cap 227 is flush with or spaced slightly above respective upper surfaces 214 of the mandibles 206. In particular, the controller 110 may do so based on one or more of: dimensions of the cap, which may include cap width or diameter; dimensions of the stem, which may include stem width or length; and orientation of the stem relative to the cap, which may include an angle relative to a plane of an underside of the cap. In this way, the mushroom 207 may be accurately and precisely positioned relative to the mandibles 206 of the mushroom gripper 205 for gripping while avoiding or minimizing damage caused by such gripping which might otherwise occur due to misalignment of the mandibles 206 with the described structures of the mushroom 207.

Figure 11:
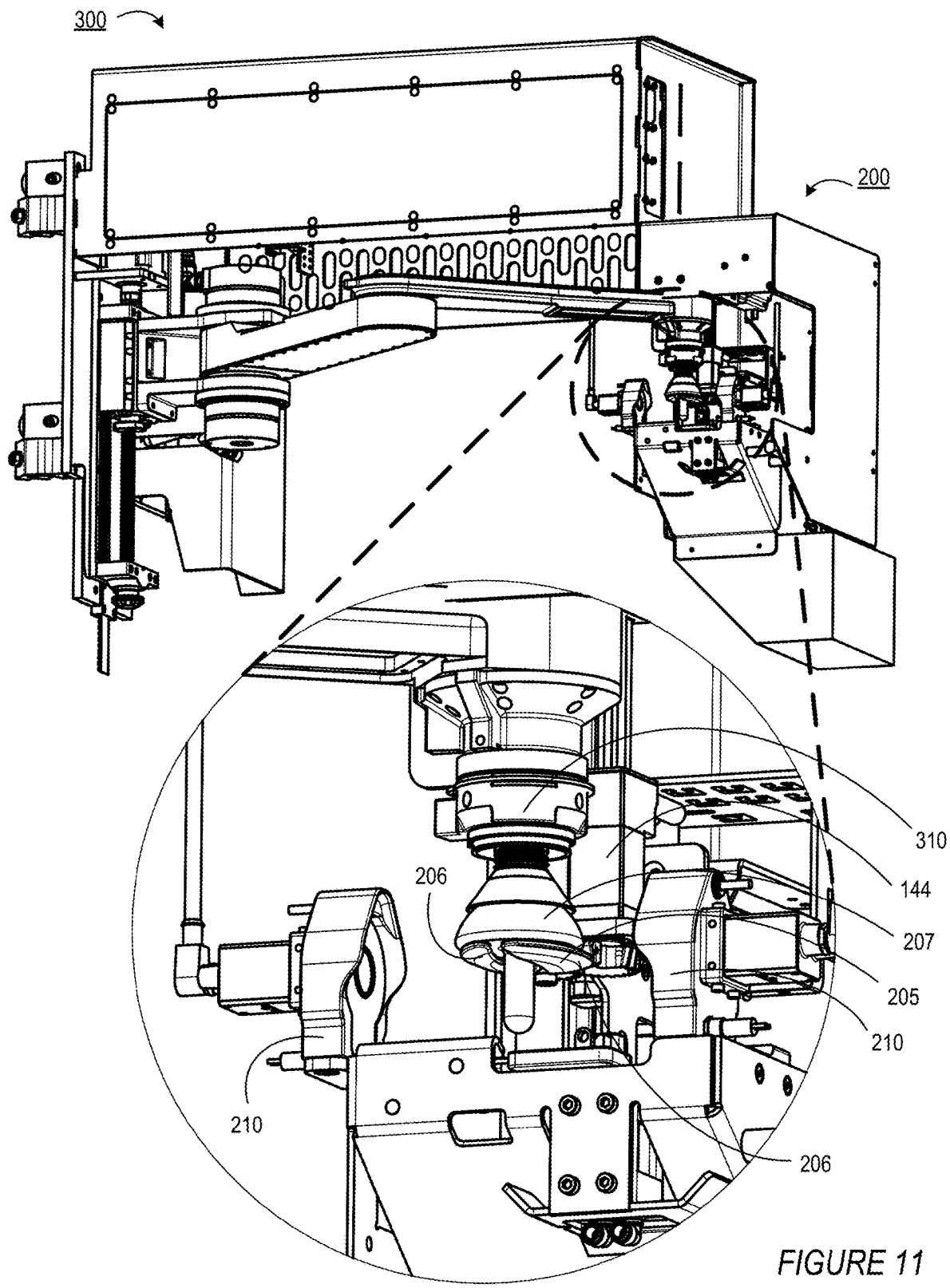
FIG. 11 is a perspective view of the SCARA system and mushroom processing station of FIG. 2 with an enlarged view showing a mushroom gripped by closed mandibles of the mushroom elevator gripper.
Figure 12:
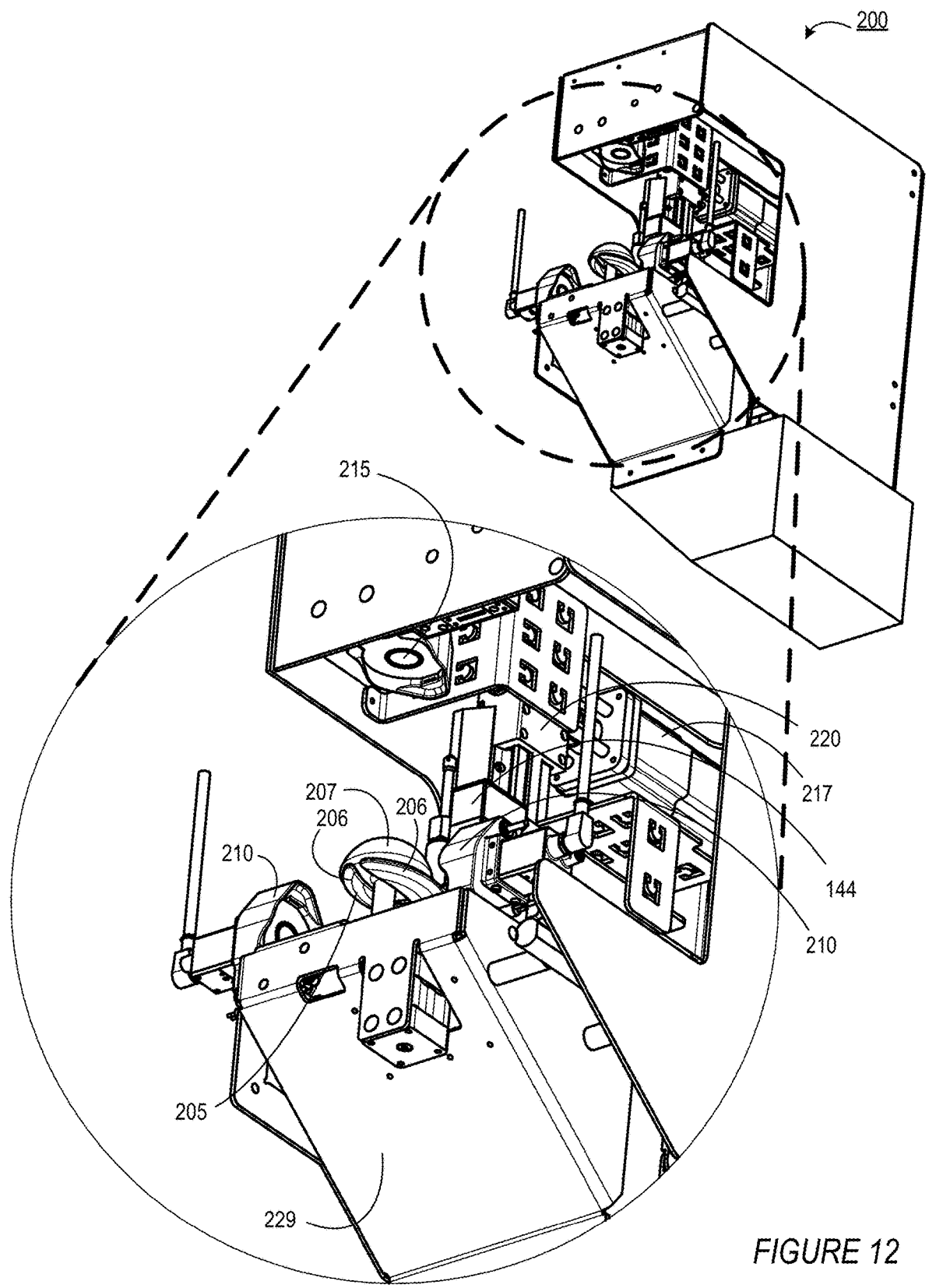
FIG. 12 is a further perspective view of the mushroom processing station of FIG. 11 with an enlarged view showing a mushroom gripped by closed mandibles of the mushroom elevator gripper.

As illustrated in FIGS. 11-12, the controller 110 may then operate the mushroom gripper 205 to close the mandles 206 about the mushroom stem 208 and beneath the mushroom cap 227. The controller 110 may then, in concert, operate the robotic arm 142 end effector 310 to release the mushroom 207, whereby the mushroom 207 is then held exclusively by the mushroom gripper 205. In particular, the mushroom gripper 205, including the mandibles 206, may be operated in such a way, which may be based on the mushroom properties determined as described above, such that inner edges of the mandibles 206 are either free from contact with the mushroom stem 208, or contact the mushroom stem 208 with pressure no greater than a preconfigured maximum pressure. Again, the controller 110 may do the foregoing based on the determined mushroom properties including at least, in this case, the stem width and the orientation of the stem relative to the cap, and in doing so may avoid or minimize damage caused by such gripping. In this way, the mushroom 207 may be supported exclusively or primarily by contact between the upper surfaces 214 of the mandibles 206 and the underside 228 of the mushroom cap 227. In this way, the mushroom 207 may be supported and positioned as further described herein using the mushroom gripper 205 while avoiding or minimizing any damage caused to the mushroom 207 by such support or positioning.

Turning now to FIG. 12-13, following release of the mushroom 207 by the robotic arm 142 end effector 310, the controller 110 may then operate the robotic arm 142 to move the end effector 310 away from the mushroom 207 (for example, to continue further operations elsewhere), thereby exposing an upper surface 239 of the mushroom cap 227 to the field of view of the top view camera 215. The controller 110 may then operate the top view camera 215 to capture second images of the mushroom 207 including the mushroom cap 227, which may form a further part of the mushroom data described above. The controller 110 may also operate the side view cameras 210 to capture third images of the mushroom 207 including the mushroom stem 208, which may form a further part of the mushroom data described above. The controller 110 may then operate the mushroom data processor 124 on the mushroom data to generate mushroom properties of the mushroom 207 which may include, without limitation, one or more of: dimensions of the cap, which may include cap width or diameter; cap shape; cap colour; stem dimensions, which may include stem width or length; stem orientation relative to the cap, which may include an angle relative to a plane of an underside of the cap; presence of soil or other defects on the stem; degree of gill opening; defects or marks; and surface texture. In particular, the mushroom properties so determined may include damage, disfigurement, marks, or other defects on the mushroom cap 227 at least potentially caused by the suction-gripping of the mushroom cap 227 by the robotic arm 142 end effector 310, based at least in part on the second images captured by the top view camera 215 after release of the mushroom 207 by the end effector 310 and movement of the end effector 310 out of the way between the top view camera 215 and the mushroom cap 227. The foregoing may constitute aspects of step 1010, step 1020, and step 1030 of method 1000, or additional steps of the method 1000.

The controller 110 may then operate the mushroom positioning system 140 and the stem trimming device 160 in concert to trim a lower portion of the mushroom stem 208 to which soil is adhered or other defects are present, or to trim the mushroom stem 208 to a predetermined length, according to the mushroom properties generated as described above. With reference to FIG. 13, this may include operating the mushroom elevator 144 to lower and position the mushroom 207 so as to lower the mushroom stem 208 into a cutting path of the trimming blade 225, and then to operate the trimming blade actuator 226 to rotate the trimming blade 225, to trim the lower end of the mushroom stem 208 a predetermined amount based on the mushroom properties described above. In particular, and as discussed above, the mushroom properties generated from the image set previously collected may include the presence of soil or other defects on the stem, which may include a threshold level at a distance below the underside of the cap where the presence of soil or other defects on the stem begins, and thus the mushroom elevator 144 may be operated to lower the mushroom 207 a predetermined distance so as to align the threshold level with the cutting path of the trimming blade 225. As also discussed above, the predetermined trim length may also incorporate a preconfigured buffer, to increase the likelihood that now soil or other defects will remain on the trimmed stem. The predetermined trim length may alternatively be based on any other factor, such as a customer-specified desired stem length. The trimming blade actuator 226 may then be operated to move the trimming blade 225 about its cutting path, which may be done suddenly and quickly, to trim the selected lower portion of the mushroom stem 208. The mushroom stem 208 may be trimmed in this way an amount sufficient such that the trimmed mushroom is free or substantially free from adhered soil and other defects, or has the desired stem length, as the case may be. In particular, where the mushroom stem 208 is to be trimmed such that the trimmed mushroom is free or substantially free from adhered soil and other defects, this result may be enabled or at least facilitated by the provision of the at least two side view cameras 210 providing views of both opposite sides of the mushroom stem 208, inasmuch as such defects may begin at different distances below the mushroom cap 227 on the opposite sides. Such result might not be obtained, or might not be obtained as well or as reliably, were only a single side view camera 210 provided and used, as it would provide a view of only one side of the mushroom stem 208. The trimmed portion of the mushroom stem 208 may fall into the debris chute 229.

Alternatively, if based on the determined mushroom properties the controller 110 determines that the mushroom 207 before trimming does not meet certain criteria, which may include any mushroom criteria or category described herein within a preconfigured threshold, the controller 110 may dispose of the mushroom 208. For example, the controller 110 may be operable to determine that one or more of the following properties does not meet certain preconfigured criteria: dimensions of the cap, which may include cap width or diameter; cap shape; cap colour; degree of gill opening; defects or marks; and surface texture. In such case, the controller 110 may be operable simply to open the mushroom gripper 205 and allow the mushroom 207 to fall into the debris chute 229. In such an embodiment, the mushroom disposal system 190 may include the debris chute 229.

Following trimming of the mushroom stem 208 as described, the controller 110 may further operate the side view cameras 210 to capture fourth images of the mushroom 207 including the mushroom stem 208, which may form a further part of the mushroom data described above. The controller 110 may then operate the mushroom data processor 124 on the mushroom data to generate mushroom properties of the mushroom 207 which may include, without limitation, one or more of: dimensions of the cap, which may include cap width or diameter; cap shape; cap colour; stem dimensions, which may include stem width or length; stem orientation relative to the cap, which may include an angle relative to a plane of an underside of the cap; presence of soil or other defects on the stem; degree of gill opening; defects or marks; and surface texture. In particular, the mushroom properties so determined may include parameters of a degree of damage caused by, consequent to, or remaining after the trimming of the mushroom stem. If, based on the determined mushroom properties the controller 110 determines that the mushroom 207 after trimming does not meet certain criteria, which may include any mushroom criteria or category described herein within a preconfigured threshold, the controller 110 may dispose of the mushroom 208 as described above. Alternatively, the controller 110 may be operable to sort the trimmed mushroom 207 as described above, and to control the mushroom positioning system 140 to move and deposit the mushroom in a selected mushroom receptacle 180-1 . . . 180-N based on the determined inclusion and/or exclusion of the mushroom with any pre-configured mushroom criteria category. In this embodiment, the controller 110 may be operable to control the robotic arm 142 end effector 310 to suction-grip the mushroom 207 at the upper surface 239 of the mushroom cap 227, and having done so to control the mushroom gripper 205 to open the mandibles 206 in order to release the mushroom 207 from the mushroom gripper 205, at which point it is exclusively held by the robotic arm 142 end effector 310, and then to control the robotic arm 142 to move the mushroom 207 away from the mushroom processing station as described, which may be to place it in a selected mushroom receptacle 180-1 . . . 180-N as described. In other embodiments, the controller 110 does not sort the trimmed mushrooms 207 in this way, but instead simply moves it as described to a common receptacle.

Thus, the method 1000 includes the step of controlling the positioning system and/or stem trimming device to process the mushroom based on the mushroom properties. The foregoing may also constitute aspects of step 1010, step 1020, and step 1030 of method 1000, or additional steps of the method 1000.

Having deposited or disposed-of the mushroom 207 as described, the mushroom processing system 100 may then proceed to perform substantially the same procedure on further mushrooms, one-at-a-time, and in this way selectively trim, sort, and dispose of mushrooms harvested from one or more mushroom beds. In any given mushroom growing establishment, multiple mushroom processing systems 100 may be provided and operate independently, and in different embodiments each system mushroom processing system 100 may have its own controller 110, while in other embodiments a single controller 110 may be communicatively connected to control multiple mushroom positioning systems 140, multiple sensor systems 150, and multiple stem trimming devices 160—which may include multiple mushroom processing stations 200, and optionally one or more SCARA systems 300, conveniently positioned throughout the establishment relative to the multiple mushroom beds—substantially as described.

It will be understood that the foregoing embodiments are merely examples of components, structures, relationships, and arrangements useful to perform the functionalities described herein. Functional equivalents for all such components, structures, relationships, and arrangements are possible and contemplated.

By way of example only, different structures and techniques for moving and positioning mushrooms are possible and contemplated. Different sensor system components are possible and contemplated, and some embodiments may include, for example, non-visible light imagers, e.g. infrared or ultraviolet, ultrasonic, LIDAR, or other imagers. In some embodiments, instead of two opposing side view cameras, the imager set includes a single side view camera and a mirror disposed on an opposite side of the mushroom gripper, such that a far side of the mushroom is visible in the mirror within the field of view of the single side view camera. Different stem trimming devices are possible and contemplated, and some embodiments may include additionally or alternatively a rotary cutter, a guillotine cutter, a leaf-blade cutter, a single-blade or dual-blade cutter, a laser cutter, a water-jet cutter or any device operable to trim a mushroom stem as described herein. Any suitable arrangements and combinations are also possible and contemplated. For example, the SCARA system 300 described above, and the mushroom processing station 200, may together form a single mushroom processing apparatus 400, with a common frame 410. Alternatively, the SCARA system 300 may be separate from the mushroom processing station 200. Multiple mushroom processing stations 200 for each SCARA system 300 may be provided in a mushroom growing facility, or vice versa, and each SCARA system 300 may be operable to cooperate with one or more of such multiple mushroom processing stations 200, or vice versa. Any further parts or components are also possible and contemplated. For example, the mushroom processing station 200 may have a housing 420 and an access door 430 to enable access the the described components of the mushroom processing station 200 for cleaning, maintenance, and repair.

Benefits and Advantages

A mushroom processing system as disclosed herein, including in any of the various embodiments disclosed herein or their functional equivalents, may provide benefits and advantages over conventional methods and techniques of mushroom harvesting, mushroom stem trimming, and sorting.

Conventionally, mushroom stem trimming and sorting are performed manually by trained inspectors, thus requiring substantial human labour, and the drawback of human error. In contrast, the disclosed mushroom processing system is automatic, and thus may have the benefits and advantages of reduced human resource requirements, reduced human error, greater efficiency, and improved speed as compared to conventional methods and techniques. In particular, the disclosed system and method enables the automatic characterization of individual mushrooms with respect to any desired combination of criteria thereby enabling automated sorting into any number of categories desired. In particular, the disclosed system and method enable automated characterization and sorting, on an individual mushroom-by-mushroom basis, including on the basis of the degree of opening of mushroom gills. Conventionally, sorting harvested mushrooms on the basis of gill opening is done manually by trained workers. The disclosed system and method, in contrast, enable the automatic characterization and sorting of mushrooms based on degree of gill opening.

In particular, as described above, providing mushroom gripper mandibles which may be moved into an open state, enables or at least facilitates providing side view cameras with an unobstructed view of the underside of the mushroom cap, thereby enabling or at least facilitating imaging of the mushroom gills, which may then be used for determining sorting of the mushroom as described. Moreover, providing a top view camera above the mushroom gripper, and moving the robotic arm end effector out of the way once the mushroom is gripped by the mushroom gripper, enables or at least facilitates imaging of the mushroom cap after handling of the mushroom by the robotic arm end effector, thereby enabling determination of any damage or other defect to the mushroom cap caused by such handling by the end effector, which may then be used for determining sorting of the mushroom as described. Finally, use of the robotic arm for transport of the mushroom after trimming enables selective deposit of the mushroom into one of a plurality of receptables, thereby enabling sorting of mushrooms based on predetermined sorting criteria as described.

Moreover, the disclosed system and method enable automated trimming of harvested mushrooms, which may include using a mushroom model to control a stem trimming device. The results of individual trimming operations, including the effect the trimming action caused, may be used to train the model continuously, and in this way each instance of the disclosed system may be improved gradually over time to optimize the trimming operations.

In these ways and others, the disclosed system and method may be operable automatically to trim individual mushroom stems and to assess and sort trimmed mushrooms, in order to optimize productivity of mushroom growing operations.

EXAMPLE EMBODIMENTS

The following are non-limiting embodiments of the disclosed subject-matter.

Embodiment 1. A mushroom processing system comprising: a stem trimming device; a positioning system; an imager set comprising at least one imager; and a controller communicatively coupled with the stem trimming device, the positioning system, and the imager set, the controller comprising a memory storing computer-readable instructions and a processor operable to perform the computer-readable instructions, whereby the controller is operable: to control the positioning system to move a single mushroom, having a stem and a cap, to bring the mushroom into view of the imager set; to control the imager set to generate an image set of the mushroom comprising at least one image; to process the image set to determine mushroom properties of the mushroom; and to control the positioning system and/or the stem trimming device to process the mushroom based on the mushroom properties.

Embodiment 2. The mushroom processing system of Embodiment 1, wherein: the imager set comprises a side imager subset comprising at least one side imager operable to image at least one side of the mushroom at a predetermined side imaging location; the image set comprises a side image subset comprising at least one side image of the mushroom including the stem; and the controller is operable: to control the positioning system to bring the mushroom to the predetermined side imaging location; to control the side imager subset to generate the side image subset of the mushroom at the predetermined side imaging location; to determine an end portion of the stem for removal based on the mushroom properties; and to control the positioning system to move the mushroom relative to the stem trimming device and to operate the stem trimming device to trim the end portion by the stem trimming device.

Embodiment 3. The mushroom processing system of Embodiment 2, wherein: the mushroom properties comprise defects on the end portion of the stem.

Embodiment 4. The mushroom processing system of Embodiment 3, wherein: the defects comprise a presence of soil on the end portion.

Embodiment 5. The mushroom processing system of Embodiment 3 or 4, wherein: the defects comprise a discoloration or disfigurement on the end portion.

Embodiment 6. The mushroom processing system of any one of Embodiments 2 to 5, wherein: the side imager subset comprises two imagers having horizontally opposing side views bracketing the predetermined side imaging location.

Embodiment 7. The mushroom processing system of any one of Embodiments 2 to 6, wherein: the controller is operable to move the mushroom relative to the stem trimming device to trim the end portion by the stem trimming device, by lowering the stem into a cutting path of the stem trimming device.

Embodiment 8. The mushroom processing system of any one of Embodiments 2 to 7, wherein: the stem trimming device comprises a rotary cutter, a guillotine cutter, a leaf-blade cutter, a single-blade cutter, a dual-blade cutter, a laser cutter, or a water-jet cutter.

Embodiment 9. The mushroom processing system of any one of Embodiments 2 to 8, wherein: the positioning system comprises an elevator comprising a gripper supported by and coupled with a vertical rail system; the gripper comprises a pair of mandibles selectively openable for positioning of the stem between the mandibles and selectively closeable about the stem for contacting an underside surface of the cap of the mushroom by respective upper surfaces of the mandibles to support the mushroom with the stem depending below the mandibles; and the controller is operable: to control the gripper to open the mandibles for positioning of the stem between the mandibles, and to close the mandibles about the stem; to control the vertical rail system to move the gripper holding the mushroom vertically to bring the mushroom to the predetermined side imaging location; and to control the vertical rail system to move the gripper holding the mushroom to move the mushroom relative to the stem trimming device to trim the end portion by the stem trimming device.

Embodiment 10. The mushroom processing system of Embodiment 9, wherein: the positioning system further comprises a robotic arm having a suctioning end effector operable selectively to suction an overside surface of the cap of the mushroom to hold the mushroom in order to move the mushroom, and to reduce suction in order to release the mushroom; and the controller is further operable: to control the robotic arm to move the mushroom to position the stem between the mandibles of the gripper when open; and the control the robotic arm to release the mushroom when the mandibles are closed about the stem.

Embodiment 11. The mushroom processing system of Embodiment 10, wherein: the side imager subset is operable to image an underside of the cap of the mushroom at a predetermined cap underside imaging location; the image set comprises a cap underside image subset comprising at least one cap underside image of the underside of the cap including gills of the mushroom; and the controller is further operable: after controlling the robotic arm to move the mushroom to position the stem between the mandibles of the gripper when open, and before closing the mandibles about the stem, to control the side imager subset to generate the cap underside image subset of the mushroom.

Embodiment 12. The mushroom processing system of any one of Embodiments 1 to 11, wherein: the imager set comprises a top imager subset comprising at least one top imager operable to image a top of the mushroom at a predetermined top imaging location; the image set comprises a top image subset comprising at least one top image of the mushroom including the cap; and the controller is operable: to control the positioning system to bring the mushroom to the predetermined top imaging location; to control the top imager subset to generate the top image subset of the mushroom at the predetermined top imaging location; to determine sorting parameters of the mushroom based on the mushroom properties; and to control the positioning system to move the mushroom based on the sorting parameters.

Embodiment 13. The mushroom processing system of Embodiment 12, further comprising: a sensor set comprising at least one sensor, wherein each of the at least one sensor is at least one of a position sensor; a motion sensor; an orientation sensor; an air temperature sensor; an air humidity sensor; and a light sensor; wherein: the controller is further operable: to operate the sensor set to generate sensor data of the mushroom; and to process the sensor data to further determine the mushroom properties of the mushroom.

Embodiment 14. The mushroom processing system of Embodiment 13, wherein: the controller is operable to control the positioning system to deposit the mushroom in one of a plurality of mushroom receptacles based on the sorting parameters.

Embodiment 15. The mushroom processing system of Embodiment 13 or 14, wherein: the sorting parameters comprise at least one of: dimensions of the cap; shape of the cap; colour of the cap; dimensions of the stem; orientation of the stem relative to the cap; presence or quantity of soil on the stem; discoloration or disfigurement on the stem; and degree of gill opening.

Embodiment 16. The mushroom processing system of any one of Embodiments 1 to 15, wherein: the controller is operable to determine the mushroom properties of the mushroom using at least one trained machine-learning model.

Embodiment 17. The mushroom processing system of any one of Embodiments 1 to 16, wherein: at least one of the at least one imager comprises an optical imager.

Embodiment 18. The mushroom processing system of Embodiment 17, wherein: the optical imager comprises a digital camera.

Embodiment 19. A method of mushroom processing performed by a controller comprising a memory storing computer-readable instructions and a processor operable to perform the computer-readable instructions to perform the method comprising: controlling a positioning system to move a single mushroom, having a stem and a cap, to bring the mushroom into view of an imager set comprising at least one imager; controlling the imager set to generate an image set of the mushroom comprising at least one image; processing the image set to determine mushroom properties of the mushroom; and controlling the positioning system and/or the stem trimming device to process the mushroom based on the mushroom properties.

Embodiment 20. A non-transient computer-readable medium storing computer-readable instructions performable by a processor to perform a method comprising: controlling a positioning system to move a single mushroom, having a stem and a cap, to bring the mushroom into view of an imager set comprising at least one imager; controlling the imager set to generate an image set of the mushroom comprising at least one image; processing the image set to determine mushroom properties of the mushroom; and controlling the positioning system and/or the stem trimming device to process the mushroom based on the mushroom properties.

Interpretation

So that the present disclosure may be more readily understood, certain terms are defined. Unless defined otherwise, all technical and scientific terms used herein have the same meaning as commonly understood by one of ordinary skill in the art to which embodiments of the invention pertain. While many methods and materials similar, modified, or equivalent to those described herein can be used in the practice of the embodiments of the present invention without undue experimentation, the preferred materials and methods are described herein.

All terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6, and decimals and fractions, for example, 1.2, 3.8, 1½, and 4¾. This applies regardless of the breadth of the range.

The terms "about" or "approximately" as used herein refer to variation in the numerical quantity that can occur, for example, through typical measuring techniques and equipment, with respect to any quantifiable variable, including, but not limited to, mass, volume, time, distance, voltage, and current. Further, given solid and liquid handling procedures used in the real world, there is certain inadvertent error and variation that is likely through differences in the manufacture, source, or purity of the ingredients used to make the compositions or carry out the methods and the like. The terms "about" and "approximately" also encompass these variations. Expressions which combine the terms "about" or "approximately" with one or more bounds of a range refer to a union of the bound modified by the term "about" or "approximately" as described above, and the range having the unmodified bound. Thus, for example, the expression "at least about X" means the union of "at least X" and "about X". Similarly, "at most about Y" means the union of "at most Y" and "about Y".

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of", or when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of". "Consisting essentially of", when used in the claims, shall have its ordinary meaning as used in the field of patent law.

Embodiments of the disclosed subject-matter are described herein using the auxiliary verb "may". When used herein, unless required otherwise by the context of usage, the auxiliary verb "may" designates an embodiment of the disclosed subject-matter which possesses the addressed object without requiring necessarily that any other embodiment of the disclosed subject-matter possesses the addressed object. Thus, a statement such as "X may include Y" indicates that the disclosed subject-matter includes embodiments where X includes Y, without requiring that all disclosed embodiments include Y, and without excluding any other embodiments which do not include Y.

While the disclosed subject-matter may be embodied in many different forms, there are described in detail herein specific embodiments. The present disclosure is an exemplification of the principles of the disclosed subject-matter and is not intended to limit the disclosed subject-matter to the particular embodiments illustrated. Furthermore, the disclosed subject-matter encompasses any possible combination of some or all of the various embodiments mentioned herein. In addition the disclosed subject-matter encompasses any possible combination that also specifically excludes any one or some of the various embodiments mentioned herein.

Different embodiments disclosed herein, including particularly the controller 110, may include any computing and related information technology useful to perform the functions described herein. Such technology may include one or more computers, one or more servers, a group or groups of multiple servers, or one or mobile computing devices. Each of these may include or use further processing or communications technologies, which may include any number of processors and processor types, such as CPUs, one or more graphics processing units (GPUs), digital signal processors (DSPs), and so forth. In general, each such processor is operable to execute or perform instructions stored in a memory. Such memory may include or interface persistent memories, such as storage. Each such processor may use any communications technology which may include network interface controllers (NICs), which may be wired or wireless controllers, operable to perform communication over a network, which may be or include the Internet. Different embodiments may include or be implemented in part or in whole in a cloud computing environment, including without limitation Amazon AWS™ or Microsoft Azure™.

In some instances, well-known hardware and software components, modules, and functions are shown in block diagram form in order not to obscure the invention. For example, specific details are not provided as to whether the embodiments described herein are implemented as a software routine, hardware circuit, firmware, or a combination thereof.

Some of the embodiments described herein include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory.

Embodiments can be implemented as a software product stored in a machine-readable medium (also referred to as a computer-readable medium, a processor-readable medium, or a computer usable medium having a computer-readable program code embodied therein), which may be non-transient. The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A mushroom processing system comprising:
a stem trimming device;
a positioning system;
an imager set comprising at least one imager;
and a controller communicatively coupled with the stem trimming device, the positioning system, and the imager set, the controller comprising a memory storing computer-readable instructions and a processor operable to perform the computer-readable instructions, whereby the controller is operable:
to control the positioning system to move a single mushroom, having a stem and a cap, to bring the mushroom into view of the imager set;
to control the imager set to generate an image set of the mushroom comprising at least one image;
to process the image set to determine mushroom properties of the mushroom; and
to control the positioning system and/or the stem trimming device to process the mushroom based on the mushroom properties.

2. The mushroom processing system of claim 1, wherein:
the imager set comprises a side imager subset comprising at least one side imager operable to image at least one side of the mushroom at a predetermined side imaging location;
the image set comprises a side image subset comprising at least one side image of the mushroom including the stem; and
the controller is operable:
to control the positioning system to bring the mushroom to the predetermined side imaging location;
to control the side imager subset to generate the side image subset of the mushroom at the predetermined side imaging location;
to determine an end portion of the stem for removal based on the mushroom properties; and
to control the positioning system to move the mushroom relative to the stem trimming device and to operate the stem trimming device to trim the end portion by the stem trimming device.

3. The mushroom processing system of claim 2, wherein:
the mushroom properties comprise defects on the end portion of the stem.

4. The mushroom processing system of claim 3, wherein:
the defects comprise a presence of soil on the end portion.

5. The mushroom processing system of claim 4, wherein:
the defects comprise a discoloration or disfigurement on the end portion.

6. The mushroom processing system of claim 5, wherein:
the side imager subset comprises two imagers having horizontally opposing side views bracketing the predetermined side imaging location.

7. The mushroom processing system of claim 6, wherein:
the controller is operable to move the mushroom relative to the stem trimming device to trim the end portion by the stem trimming device, by lowering the stem into a cutting path of the stem trimming device.

8. The mushroom processing system of claim 7, wherein:
the stem trimming device comprises a rotary cutter, a guillotine cutter, a leaf-blade cutter, a single-blade cutter, a dual-blade cutter, a laser cutter, or a water-jet cutter.

9. The mushroom processing system of claim 8, wherein:
the positioning system comprises an elevator comprising a gripper supported by and coupled with a vertical rail system;
the gripper comprises a pair of mandibles selectively openable for positioning of the stem between the mandibles and selectively closeable about the stem for contacting an underside surface of the cap of the mushroom by respective upper surfaces of the mandibles to support the mushroom with the stem depending below the mandibles; and
the controller is operable:
to control the gripper to open the mandibles for positioning of the stem between the mandibles, and to close the mandibles about the stem;
to control the vertical rail system to move the gripper holding the mushroom vertically to bring the mushroom to the predetermined side imaging location; and
to control the vertical rail system to move the gripper holding the mushroom to move the mushroom relative to the stem trimming device to trim the end portion by the stem trimming device.

10. The mushroom processing system of claim 9, wherein:
the positioning system further comprises a robotic arm having a suctioning end effector operable selectively to suction an overside surface of the cap of the mushroom to hold the mushroom in order to move the mushroom, and to reduce suction in order to release the mushroom; and the controller is further operable:
  to control the robotic arm to move the mushroom to position the stem between the mandibles of the gripper when open; and
  the control the robotic arm to release the mushroom when the mandibles are closed about the stem.

11. The mushroom processing system of claim 10, wherein:
  the side imager subset is operable to image an underside of the cap of the mushroom at a predetermined cap underside imaging location;
  the image set comprises a cap underside image subset comprising at least one cap underside image of the underside of the cap including gills of the mushroom; and
  the controller is further operable:
    after controlling the robotic arm to move the mushroom to position the stem between the mandibles of the gripper when open, and before closing the mandibles about the stem, to control the side imager subset to generate the cap underside image subset of the mushroom.

12. The mushroom processing system of claim 11, wherein:
  the imager set comprises a top imager subset comprising at least one top imager operable to image a top of the mushroom at a predetermined top imaging location;
  the image set comprises a top image subset comprising at least one top image of the mushroom including the cap; and
  the controller is operable:
    to control the positioning system to bring the mushroom to the predetermined top imaging location;
    to control the top imager subset to generate the top image subset of the mushroom at the predetermined top imaging location;
    to determine sorting parameters of the mushroom based on the mushroom properties; and
    to control the positioning system to move the mushroom based on the sorting parameters.

13. The mushroom processing system of claim 12, further comprising:
  a sensor set comprising at least one sensor, wherein each of the at least one sensor is at least one of a position sensor; a motion sensor; an orientation sensor; an air temperature sensor; an air humidity sensor; and a light sensor;
  wherein:
  the controller is further operable:
  to operate the sensor set to generate sensor data of the mushroom; and
  to process the sensor data to further determine the mushroom properties of the mushroom.

14. The mushroom processing system of claim 13, wherein:
  the controller is operable to control the positioning system to deposit the mushroom in one of a plurality of mushroom receptacles based on the sorting parameters.

15. The mushroom processing system of claim 14, wherein:
  the sorting parameters comprise at least one of:
    dimensions of the cap;
    shape of the cap;
    colour of the cap;
    dimensions of the stem;
    orientation of the stem relative to the cap;
    presence or quantity of soil on the stem;
    discoloration or disfigurement on the stem; and
    degree of gill opening.

16. The mushroom processing system of claim 15, wherein:
  the controller is operable to determine the mushroom properties of the mushroom using at least one trained machine-learning model.

17. The mushroom processing system of claim 16, wherein:
  at least one of the at least one imager comprises an optical imager.

18. The mushroom processing system of claim 17, wherein:
  the optical imager comprises a digital camera.

19. A method of mushroom processing performed by a controller comprising a memory storing computer-readable instructions and a processor operable to perform the computer-readable instructions to perform the method comprising:
  controlling a positioning system to move a single mushroom, having a stem and a cap, to bring the mushroom into view of an imager set comprising at least one imager;
  controlling the imager set to generate an image set of the mushroom comprising at least one image;
  processing the image set to determine mushroom properties of the mushroom; and
  controlling the positioning system and/or the stem trimming device to process the mushroom based on the mushroom properties.

20. A non-transient computer-readable medium storing computer-readable instructions performable by a processor to perform a method comprising:
  controlling a positioning system to move a single mushroom, having a stem and a cap, to bring the mushroom into view of an imager set comprising at least one imager;
  controlling the imager set to generate an image set of the mushroom comprising at least one image;
  processing the image set to determine mushroom properties of the mushroom; and
  controlling the positioning system and/or the stem trimming device to process the mushroom based on the mushroom properties.

\* \* \* \* \*